United States Patent
Schmitz et al.

(10) Patent No.: US 11,007,431 B2
(45) Date of Patent: May 18, 2021

(54) MOTOR-DRIVEN ADJUSTABLE-TENSION TRIGGER

(71) Applicant: Microsoft Technology Licensing, LLC, Redmond, WA (US)

(72) Inventors: Aaron Schmitz, Redmond, WA (US); Gabriel Michael Rask Gassoway, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/519,780

(22) Filed: Jul. 23, 2019

(65) Prior Publication Data

US 2019/0344170 A1 Nov. 14, 2019

Related U.S. Application Data

(63) Continuation of application No. 15/611,633, filed on Jun. 1, 2017, now Pat. No. 10,384,123.

(51) Int. Cl.

| | |
|---|---|
| *A63F 13/24* | (2014.01) |
| *A63F 13/285* | (2014.01) |
| *G06F 3/01* | (2006.01) |
| *A63F 13/2145* | (2014.01) |
| *G06F 3/0338* | (2013.01) |
| *G06F 3/0362* | (2013.01) |
| *G06F 3/044* | (2006.01) |

(52) U.S. Cl.
CPC .......... *A63F 13/24* (2014.09); *A63F 13/2145* (2014.09); *A63F 13/285* (2014.09); *G06F 3/016* (2013.01); *G06F 3/0338* (2013.01); *G06F 3/0362* (2013.01); *A63F 2300/1037* (2013.01); *A63F 2300/1075* (2013.01); *G06F 3/044* (2013.01)

(58) Field of Classification Search
CPC ............................. A63F 13/285; G06F 3/0362
USPC ......................................... 318/3, 558; 463/30
See application file for complete search history.

(56) References Cited

U.S. PATENT DOCUMENTS

| | | | |
|---|---|---|---|
| 7,182,691 B1 * | 2/2007 | Schena | ................... A63F 13/06 463/38 |
| 9,778,743 B2 * | 10/2017 | Grant | .................... A63F 13/285 |
| 9,939,902 B2 * | 4/2018 | Grant | ...................... A63F 13/24 |
| 2003/0063291 A1 | 4/2003 | Bloch et al. | |

(Continued)

OTHER PUBLICATIONS

"Non Final Office Action Issued in U.S. Appl. No. 15/611,591", dated Jul. 2, 2019, 9 Pages.

(Continued)

*Primary Examiner* — David Luo
(74) *Attorney, Agent, or Firm* — Alleman Hall Creasman & Tuttle LLP

(57) ABSTRACT

A user-input device includes a user-actuatable trigger configured to pivot about a trigger axis, a rack gear, a return spring operatively intermediate the user-actuatable trigger and the rack gear, a force-feedback motor and a posture sensor configured to determine a posture of the user-actuatable trigger about the trigger axis. The return spring is configured to forward bias the user-actuatable trigger toward an extended posture. The force-feedback motor is configured to drive the rack gear based on a force-feedback signal and thereby adjust a spring force applied by the return spring to the user-actuatable trigger.

20 Claims, 14 Drawing Sheets

(56) References Cited

U.S. PATENT DOCUMENTS

2006/0197741 A1  9/2006  Biggadike
2015/0190189 A1  7/2015  Yates et al.

OTHER PUBLICATIONS

"Non-Final Office Action Issued in U.S. Appl. No. 15/611,666", dated Aug. 28, 2019, 8 Pages.
"Non Final Office Action Issued in U.S. Appl. No. 15/611,556", dated Sep. 6, 2019, 6 Pages.
"Final Office Action Issued in U.S. Appl. No. 15/611,591", dated Dec. 26, 2019, 9 Pages.
"Final Office Action Issued in U.S. Appl. No. 15/611,666", dated Feb. 4, 2020, 8 Pages.
"Final Office Action Issued in U.S. Appl. No. 15/611,556", dated Feb. 18, 2020, 6 Pages.
"Office Action Issued in European Patent Application No. 18733023.8", dated Dec. 18, 2020, 5 Pages.

* cited by examiner

MOTOR-DRIVEN ADJUSTABLE-TENSION TRIGGER

CROSS REFERENCE TO RELATED APPLICATIONS

This application is a continuation of U.S. patent application Ser. No. 15/611,633, filed Jun. 1, 2017, the entire contents of which is hereby incorporated herein by reference for all purposes.

BACKGROUND

A user-input device, such as a video game controller, may be used to provide user input to control an application executed by a computing device, such as an object or a character in a video game, or to provide some other form of control. A video game controller may include various types of physical controls that may be configured to be manipulated by a finger to provide different types of user input. Non-limiting examples of such controls may include triggers, push buttons, touch pads, joysticks, paddles, bumpers, and directional pads. The various physical controls may be physically manipulated, and the physical controller may send control signals to a computing device based on such physical manipulation to effect control of an application executed by the computing device, for example.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A user-input device includes a user-actuatable trigger configured to pivot about a trigger axis, a rack gear, a return spring operatively intermediate the user-actuatable trigger and the rack gear, a force-feedback motor, and a posture sensor configured to determine a posture of the user-actuatable trigger about the trigger axis. The return spring is configured to forward bias the user-actuatable trigger toward an extended posture. The force-feedback motor is configured to drive the rack gear based on a force-feedback signal and thereby adjust a spring force applied by the return spring to the user-actuatable trigger.

DETAILED DESCRIPTION

Figure 1:
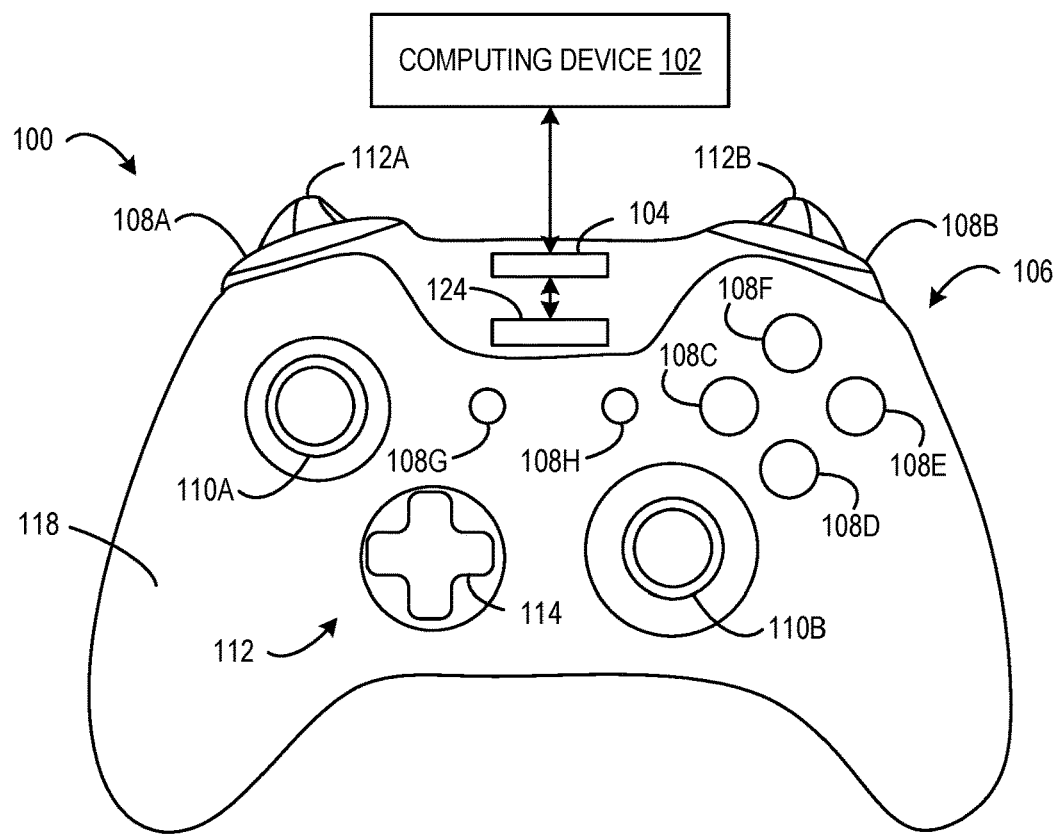
FIGS. 1-2 show an example user input device.

Input devices, such as game controllers, may include one or more vibrators (e.g., Eccentric Rotational Mass (ERMs)) configured to vibrate the entire game controller body such that the vibration is felt in the palm of the hand(s) supporting the controller. Further, in some implementations, vibrator(s) may be localized to user-actuatable trigger(s) of the game controller to provide independent localized vibrations in each trigger. For example, localized vibrations or pulses through a user's finger(s) may approximate a recoil of a real or fantasy weapon in a first person shooting game or another type of game.

Although a vibrator can provide feedback in the form of vibration, a vibrator cannot adjust any other user-perceived state of the trigger, such as a resistance/tension, return speed, and/or a length of travel/rotation. Moreover, a vibrator cannot dynamically change the user-perceived state of the trigger based on varying conditions, such as a parameter of a computing device/video game, or user preferences.

Accordingly, the present disclosure is directed to a user-input device including a user-actuatable trigger configured to rotate about a trigger axis and operatively connected with a force-feedback motor. The force-feedback motor is configured to activate based on a force-feedback signal received by a computing device in communication with the user-input device. When activated, the force-feedback motor is configured to selectively drive the trigger (e.g., by applying a torque, linear force, or adjustable tension via spring) and adjust a user-perceived state of the trigger.

Such a motor-driven, force-feedback trigger configuration enables the user-perceived state of the trigger to be dynamically adjusted in a variety of ways. For example, the trigger may be driven by the force-feedback motor to adjust a user-perceived resistance of the user-actuatable trigger. In another example, the trigger may be driven by the force-feedback motor to simulate a hard stop that effectively adjusts a pull length or range of rotation of the trigger. In another example, the trigger may be driven by the force-feedback motor to assist the trigger in returning to a fully-extended or "unpressed" posture when a user's finger is removed from the trigger. In another example, the trigger may be driven by the force-feedback motor to vibrate the trigger.

Furthermore, such a motor-driven, force-feedback trigger configuration enables the user-perceived state of the trigger to be dynamically adjusted in any suitable manner based on any suitable conditions. For example, the user-perceived state of the trigger may be changed based on a parameter of a computing device or an application executed by the computing device, such as a game parameter of a video game. In one example, the user-perceived resistance of the trigger is dynamically adjusted to correspond to characteristics (e.g., pull length, pull weight) of different virtual triggers of different virtual weapons. In another example, the user-perceived state of the trigger may be dynamically adjusted based on different user preferences. Such dynamic control of the user-perceived state of the trigger may increase a level of immersion of a user experience, such as playing a video game.

Figure 2:
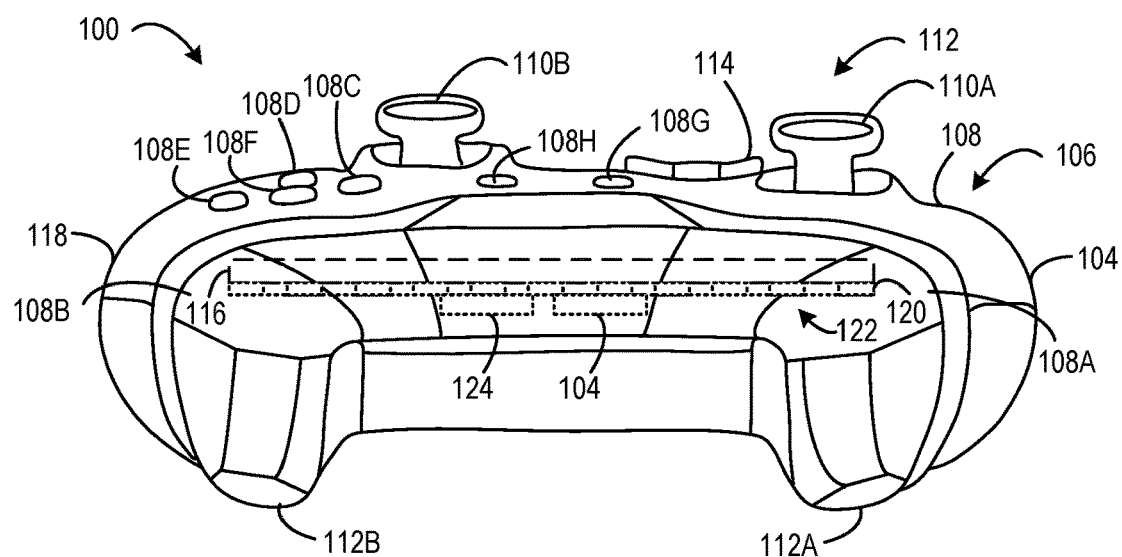

FIGS. 1-2 show an example user-input device in the form of a physical video game controller 100. The game controller 100 is configured to translate user input into control signals. These control signals are provided to a computing device 102, such as a gaming console to control an operating state of the computing device 102. For example, the game controller 100 may translate user input into control signals to control an application (e.g., video game) executed by the computing device 102, or to provide some other form of control. The game controller 100 includes a communication subsystem 104 configured to communicatively couple the game controller 100 with the computing device 102. The communication subsystem 104 may include a wired or wireless connection with the computing device 102. The communication subsystem 104 may include any suitable communication hardware to enable communication according to any suitable communication protocol (e.g., Wi-Fi, Bluetooth). For example, such communicative coupling may enable two-way communication between the game controller 100 and the computing device 102.

The control signals sent from the game controller 100 to the computing device 102 via the communication subsystem 104 may be mapped to commands to control a video game or any other application, or to perform any other computing operations The computing device 102 and/or the game controller 100 may be configured to map different control signals to different commands based on a state of the computing device 102, the game controller 100, a particular application being executed by the computing device 102, and/or a particular identified user that is controlling the game controller 100 and/or the computing device 102.

The game controller 100 includes a plurality of physical controls 106 configured to generate different control signals responsive to physical manipulation. The physical controls 106 may include a plurality of action buttons 108 (e.g., 108A, 108B, 108C, 108D, 108E, 108F, 108G, and 108H), a plurality of joysticks 110 (e.g., a left joystick 110A and a right joystick 110B), a plurality of triggers 112 (e.g., a left trigger 112A and a right trigger 112B), and a directional pad 114. The game controller 100 may include any number of physical controls, any type of physical controls, any number of electronic input sensors, and any type of electronic input sensors without departing from the scope of this disclosure.

Physical controls 106 may be coupled to one or more frames 116 (shown in FIG. 2). The frame(s) 116 may be contained in a housing 118 of the game controller 100. One or more printed circuit boards 120 may be coupled to the frame(s) 116. Although a single printed circuit board is depicted, in some implementations, two or more printed circuit boards may be employed in the game controller 100. The printed circuit board 120 may include a plurality of electronic input sensors 122. Each electronic input sensor 122 may be configured to generate an activation signal responsive to interaction with a corresponding physical control 106, or may determine a state or characteristic of a corresponding physical control 106. Non-limiting examples of electronic input sensors include dome switches, tactile switches, posture sensors (e.g., Hall Effect sensors), force sensors, speed sensors, potentiometers, and other magnetic or electronic sensing components. Any suitable sensor may be implemented in the game controller 100.

Each of the action buttons 108 may be configured to activate a corresponding electronic input sensor 122, to generate an activation signal responsive to being depressed (e.g., via physical manipulation). Each of the joysticks 110 may be configured to provide two-dimensional input that is based on a position of the joystick in relation to a default "center" position. For example, the joysticks 110 may interact with electronic input sensors in the form of potentiometers that use continuous electrical activity to provide an analog input control signal. The directional pad 114 may be configured to reside in an "unpressed" posture when no touch force is applied to the directional pad 114. In the unpressed posture, the directional pad 110 does not cause any of the plurality of electronic input sensors 122 to generate an activation signal. Further, the directional pad 114 may be configured to move from the unpressed posture to a selected activation posture responsive to a touch force being applied to the directional pad 114. The selected activation posture may be one of multiple different activation postures that each generate a different activation signal, or a combination of activation signals, by interfacing with different electronic input sensors.

Each of the triggers 112 may be configured to pivot about a trigger axis between an extended posture and a retracted posture. Each of the triggers 112 may be forward biased to pivot towards the fully-extended posture when not being manipulated by an external force. For example, each of the triggers 112 may pivot based on manipulation by a user's finger away from the fully-extended posture and toward the retracted posture. As such, the triggers 112 may be referred to as user-actuatable triggers.

Furthermore, in some implementations, under some conditions, the triggers 112 may be configured to pivot due to being driven by a force-feedback motor without manipulation from a user's finger. For example, a trigger 112 may be driven by a force-feedback motor and held at a retracted posture as part of a real-time effect for a video game. In one example, the real-time effect indicates that a virtual weapon is out of ammunition and needs to be reloaded. Each trigger 112 may be driven by a force-feedback motor to adjust any suitable user-perceived state of the trigger 112.

Different aspects of the each of the triggers 112 may be determined by different activation sensors. Each of these sensors may generate one or more activation signals that may be used to control operation of the triggers 112 and/or the computing device 102.

Note that an activation signal produced by an electronic input sensor 122 when a corresponding physical control 106 is in an activation posture may be any signal that differs from a signal or lack thereof produced by the electronic input sensor 122 in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100. An activation signal produced by an electronic input sensor 122 may take any suitable form.

The game controller 100 includes an integrated microcontroller 124 configured to receive activation signals from the plurality of physical controls 106, and send the activation signals to the computing device 102, via the communication subsystem 104. Further, the computing device 102 may use the activation signals to control operation of the computing device 102, such as controlling a video game or other application executed by the computing device 102. Further, the microcontroller 124 is configured to receive, via the communication subsystem 104, control signals from the computing device 102. The microcontroller 124 may use the control signals to control operation of the game controller 100. For example, the microcontroller 124 may receive force-feedback signals to control operation of a force-feedback motor to drive one or more of the triggers 112.

In some implementations, the microcontroller 124 may be configured to control operation of the force-feedback motor without continuously receiving control signals (e.g., force feedback signals) from the computing device 102. In other words, the microcontroller 124 may be configured to perform at least some of the functionality of the computing device 102 related to controlling operation of the triggers 112. In some implementations, the microcontroller 124 may control operation of the force-feedback motor to drive the triggers 112 based on one or more force-feedback definitions. For example, a force-feedback definition may be a data structure representing one or more resistance/assistance/vibration profiles that may be used throughout the course of playing a video game or interacting with an application. In some implementations, the computing device 102 may send one or more force-feedback definitions to the game controller 100. In some such implementations, the microcontroller 124 may control operation of the force-feedback motor to drive the trigger 112 based on one or more force-feedback definitions until the computing device 102 sends different force-feedback definitions to the game controller 100, and then the microcontroller 124 may control the force-feedback motor based on the updated force-feedback definitions. In other implementations, the microcontroller 124 may be pre-loaded with one or more force-feedback definitions. In some such implementations, the microcontroller 100 may control operation of the force-feedback motor to drive the trigger 112 without being required to communicate with the computing device 100. In some implementations, the microcontroller 124 may continue to receive operating parameters (e.g., video game parameters) from the computing device 102 that affect how the microcontroller 124 uses the force-feedback definition(s) to control the force-feedback motor. In such implementations, since force-feedback processing is handled on-board by the microcontroller 124, the force feedback control loop does not depend on processing by the computing device 102. In this way, force-feedback control may be perceived as substantially real-time feedback to the user.

The force-feedback definitions may allow the force-feedback triggers to be controlled in a manner that is exceedingly configurable. The force-feedback definitions may define rules that are a function of any suitable input (e.g., the posture sensor, the force sensor, the touch sensor, time, the state of any other controller input including buttons, thumbsticks, and the sensors of other triggers, or any combination thereof).

In one example of a force-feedback definition, if the posture of the trigger is more than fifteen degrees from the fully-extended posture, then the target force is ten Newtons; otherwise if the posture of the trigger is less than fifteen degrees from the fully-extended posture, then the target force is a maximum force of one Newton. This example defines a hard stop at fifteen degrees. In another example of a force-feedback definition, if the posture of the trigger is greater than ten degrees from the fully-extended posture, the target force tracks a sine wave function having a maximum amplitude of five Newtons.

These rules may result in a force-feedback signal being output to control the force-feedback motor. In some examples, the force-feedback signal may define a target or set point for the force-feedback motor to try to achieve/maintain. The target or set point may take various forms. For example, the target may be a trigger position, trigger velocity, trigger force, or a combination of thereof. When two or more different targets are used, one or more of the sub-targets may act as constraints which cannot be violated. In one example, a first sub-target requires the trigger to move to a fully-extended posture, but a second sub-target dictates that the maximum force cannot exceed five Newtons. A target may be constant, a time variant profile, or a constant or time-variant function of one or more inputs. Such functions may be defined in any suitable manner. In one example, the function is a set of points from which the output is linearly interpolated based on the input. In another example, the function is a set of value/range pairs from which the value is selected when the input is in the corresponding range.

Figure 3:
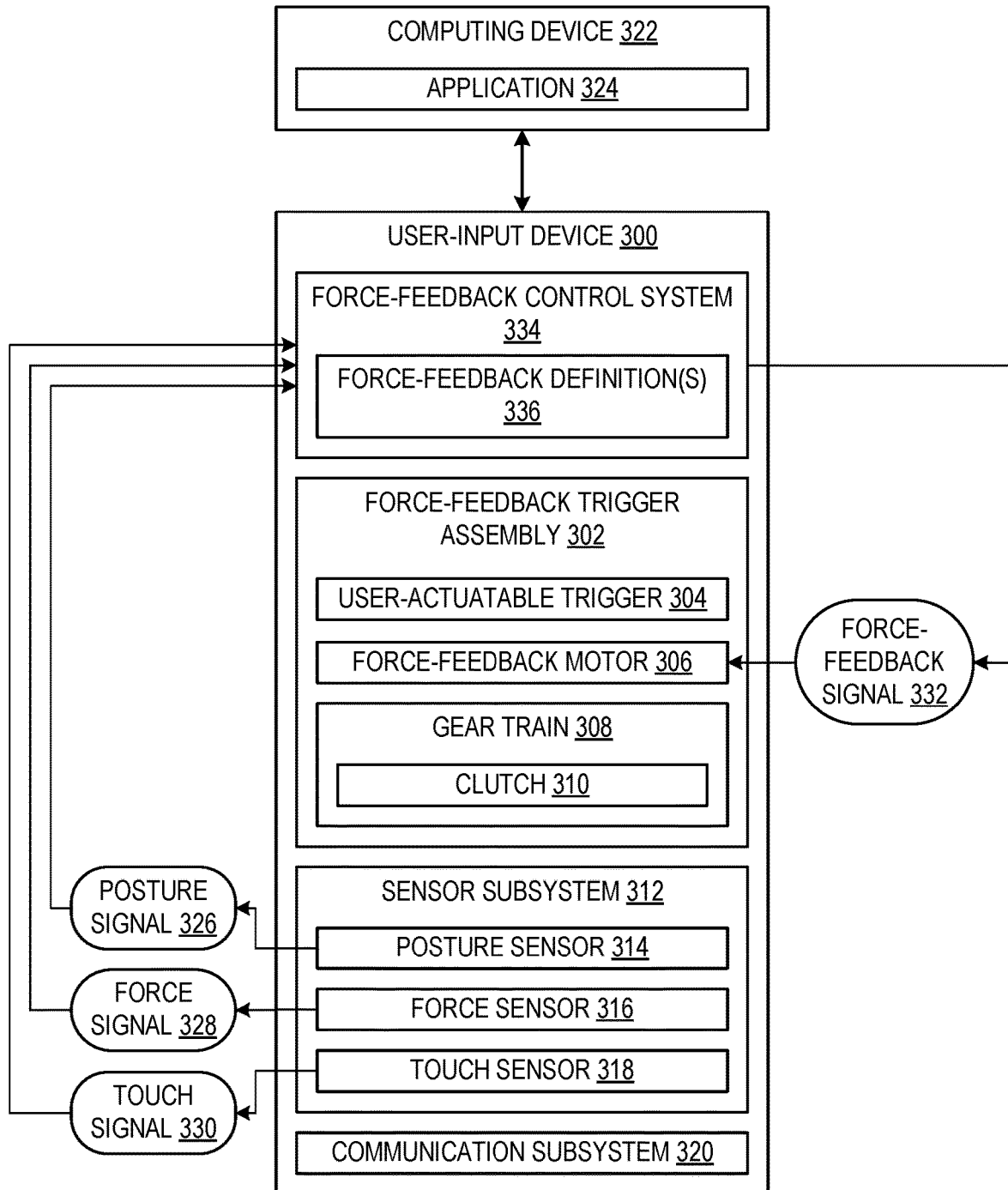
FIG. 3 schematically shows an example user input device.
Figure 4A:
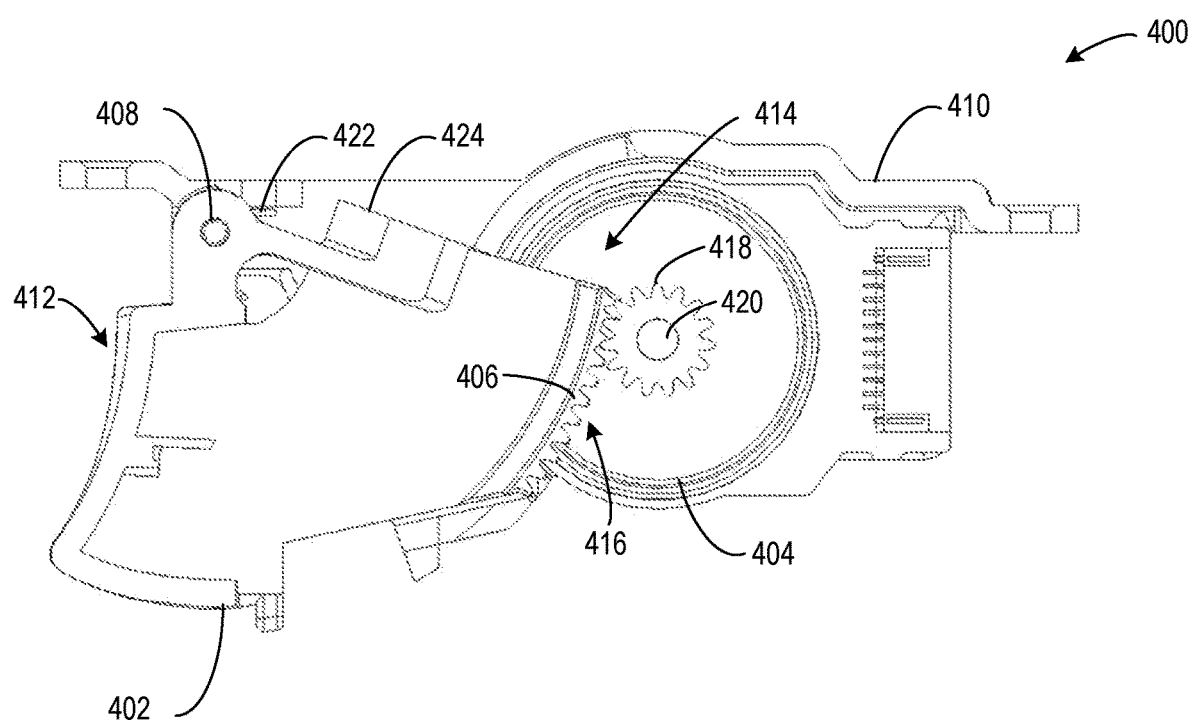
FIGS. 4A-4B show an example force-feedback trigger assembly including a sector rotary gear interfacing with a force-feedback motor.
Figure 4B:
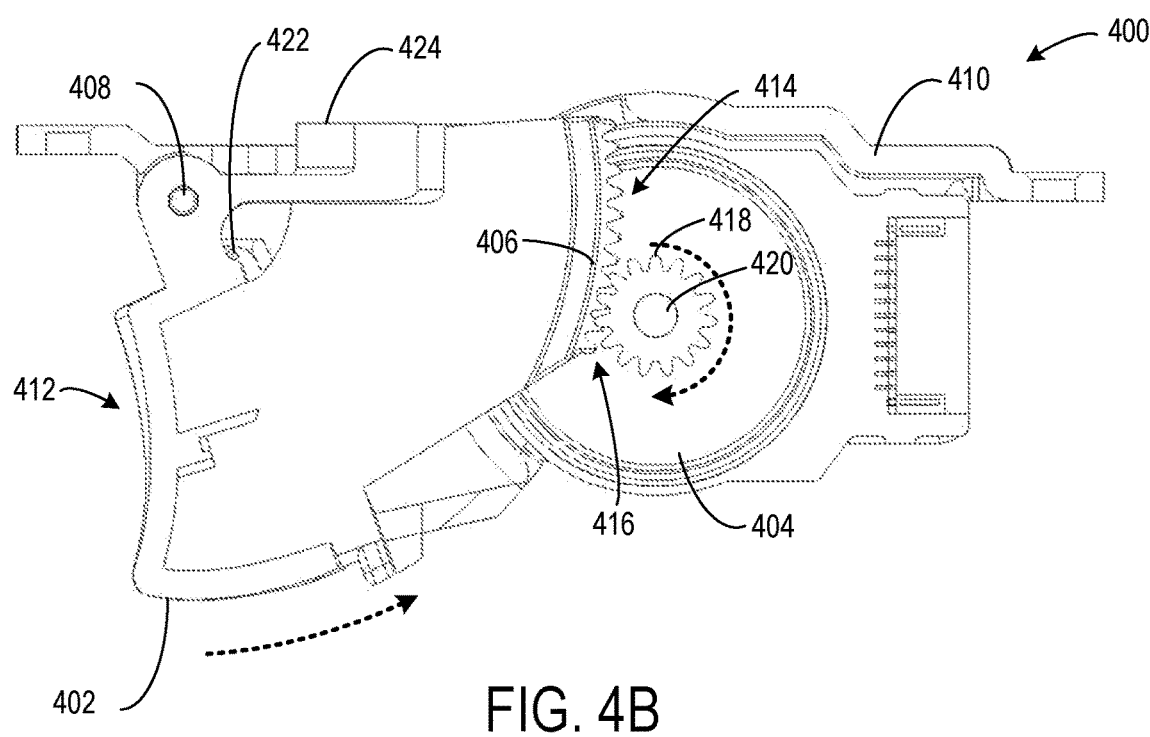

FIG. 3 schematically shows an example user-input device 300 including a force-feedback trigger assembly 302. The user-input device 300 may be an example of the game controller 100 of FIG. 1. The force-feedback trigger assembly 302 is configured to receive user input in the form of touch and/or pull force from a user's finger (e.g., index finger) and further provide force feedback to the user. The force-feedback trigger assembly 302 includes a trigger 304 (e.g., trigger 112 of FIG. 1), a force-feedback motor 306, and a gear train 308 operatively intermediate the trigger 304 and the force-feedback motor 306.

The trigger 304 is configured to pivot about a trigger axis or otherwise move under an applied external force (e.g., via a user's index finger). The trigger 304 is rotatable from a fully-extended posture (sometimes referred to herein as an unpressed posture) through a pivot range to a fully-retracted posture (sometimes referred to herein as a fully pressed posture). The pivot range may be any suitable angular range about the trigger axis. In some implementations, the trigger 304 may be forward biased to remain in the fully-extended posture when no external force (e.g., touch force) is applied to the trigger 304. For example, the assembly 302 may include a return spring to forward bias the trigger 304.

The force-feedback motor 306 is configured to drive the trigger 304 via the gear train 308 to adjust a user-perceived state of the trigger 304. The force-feedback motor 306 has a fixed position within the trigger assembly 302 and does not move with the trigger 302. For example, the motor may be coupled in a fixed position to the frame or the housing of the user-input device 300. The force-feedback motor 306 may be activated to provide a user-perceived resistance (e.g., pull weight, soft stop, hard stop), return assistance, vibration, or another form of force feedback via the trigger 304. The force-feedback motor 306 may include any suitable type of motor that can provide an appropriate torque and speed response for force feedback. Non-limiting examples of motors that may be used in the force-feedback trigger assembly 302 include a brushed direct current (DC) motor, a brushless DC motor, and a stepper motor. The brushed DC motor may be less expensive, but louder, not as compact, and less power efficient than the brushless DC motor.

The force-feedback motor 306 may be configured to drive the trigger 304 in any suitable manner. The force-feedback motor 306 may operate at any suitable speed and in any suitable direction to output torque to achieve a desired user-perceived state of the trigger 304. Further, the force-feedback motor 306 may rotate in different directions to adjust the trigger 304 differently. For example, the force-feedback motor 306 may rotate in different directions to pivot the trigger 304 in different directions about the trigger axis (e.g., forward direction toward the fully-extended posture or the backward direction toward the fully-retracted posture). In another example, the force-feedback motor 306 may alternate between rotating in a forward direction and a backward direction to generate a desired series of pulses or vibrations. The period, speed, and/or frequency of rotation in either direction may be varied to adjust the amplitude of the pulses/vibrations.

The gear train 308 may operatively connect the force-feedback motor 306 to the trigger 304 in any suitable arrangement that allows the force-feedback motor 306 to selectively drive the trigger 304. The gear train 308 may include one or more reduction gears configured to provide speed and/or torque conversions from the force-feedback motor to the trigger 304. The reduction gears may provide any suitable magnitude of speed/torque conversion/reduction. The gear train 308 may include any suitable type of gear(s). Non-limiting examples of gears that may be used in the gear train 308 include rotary spur gears, rack-and-pinion gears, helical gears, herringbone gears, planetary gears, worm gears, and bevel gears. Furthermore, gear train 308 may include any other suitable torque-transferring elements such as shafts, couplings, belts and pulleys, chains and sprockets, clutches, and differentials.

In some implementations, the gear train 308 may include a clutch 310 operatively intermediate the trigger 304 and the force-feedback motor 306. The clutch 310 is configured to mechanically change engagement between the trigger 304 and the force-feedback motor 306. For example, when the clutch 310 is engaged, the force-feedback motor 306 drives the trigger 304 via the clutch 310 to adjust a user-perceived state of the trigger 304. In another example, when the clutch 310 is disengaged, the force-feedback motor 306 may drive the clutch 310, but since the clutch is not engaged, the clutch 310 does not drive the trigger 304. In yet another example, the clutch 310 may lessen or mitigate a drag of the force-feedback motor 306 (and at least some of the gear train 308) from the trigger 304.

In some implementations, the clutch 310 may be a one-way clutch configured to disengage the trigger 304 from the force-feedback motor 306 when the trigger 304 pivots in the forward direction toward the fully-extended posture. In this way, the motor drag may be lessened or mitigated from the trigger 304 whenever the trigger 304 is released from a user's finger in order to provide a faster return rate of the trigger 304.

In some implementations, the clutch 310 may be an active/electronic clutch that disengages the trigger 304 from the force-feedback motor 306 via electronically controlled actuation. For example, the active clutch may include a solenoid that is actuated based on a control signal to selectively break the mechanical linkage between the trigger 304 and the force-feedback motor 306. In other examples, the active clutch may include another motor, a piezo, an electromagnetic or electrostatic clutch, or any other suitable mechanism for engaging and disengaging trigger 304 from force-feedback motor 306.

The user-input device 300 further includes a sensor subsystem 312 including one or more sensors configured to determine aspects of the force-feedback trigger assembly 302. The sensor subsystem 312 may include any suitable number of sensors and any suitable type of sensors to determine aspects of the force-feedback trigger assembly 302.

The sensor subsystem 312 may include a posture sensor 314 configured to determine a posture of the trigger 304 about the trigger axis. The determined posture may include one or more motion parameters of the trigger 304, such as displacement, velocity, acceleration, angle, absolute position, or a combination thereof. Non-limiting examples of types of posture sensors that may be employed include mechanical sensors (e.g., limit switch), optical sensors (e.g., optical encoder or optical break sensor), magnetic sensors (e.g., magnetic reed switch or magnetic encoder), capacitive sensors, potentiometers, or a combination thereof. In one example, a magnet is coupled to the trigger 304, and the posture sensor 314 includes a Hall effect sensor configured to determine the posture of the trigger 304 based on the position of the magnet relative to the Hall effect sensor. The posture sensor 314 may be configured to send a posture signal 326 that communicates the posture of the trigger 302 to a force-feedback control system 334.

The sensor subsystem 312 may include a force sensor 316 configured to determine an actuation force applied to the trigger 304 by a user's finger. The force sensor 316 may take any suitable form and may be positioned in any suitable manner within the assembly 302 to determine the actuation force applied to the trigger 302. For example, the force sensor 316 may be integrated into the trigger 304. In particular, the force sensor 312 may be operatively intermediate a finger-interface portion and a motor-interface portion of the trigger 304. For example, in some such implementations, the force sensor 316 may include a pair of capacitive plates configured to determine the actuation force based on a relative capacitance between the pair of capacitive plates. In another example, the force sensor 316 may include a torque gauge operatively intermediate the force-feedback motor 308 and the trigger 304, such as integrated into a gear in the gear train 308. In yet another example, the force sensor 316 may include a current monitoring device configured to determine the actuation force from a motor current of the force-feedback motor 308. The force sensor 316 may be configured to send a force signal 328 that communicates and actuation force applied to the trigger 302 to the force-feedback control system 334.

The sensor subsystem 312 may include a touch sensor 318 operatively coupled to the trigger 304 and configured to detect a finger touch on the trigger 304. The touch sensor 318 may take any suitable form. For example, the touch sensor 318 may be capacitive, resistive, or optical. In some implementations, touch sensor 318 additionally or alternatively may be configured to detect touch on the trigger 304 and/or a finger in proximity to the trigger 304. Furthermore, touch sensor 318 may be used to sense an approximate distance of the finger from trigger 304. As such, touch sensor 318 may be used either as a binary sensor that detects whether a finger is present or as an analog sensor that detects the approximate position of the finger if the finger is present. In one example, the touch sensor 318 may include one or more capacitive plates operatively coupled to a finger-interface portion of the trigger 304 and configured to detect a finger touch based on a capacitance of the finger to a plate or between a pair of plates. In one example implementation, a pair of capacitive plates may act as a force sensor by detecting the change in capacitance between the plates as the plates are compressed together. In some implementations, a pair of plates may be used as both a touch sensor and a force sensor. The touch sensor 318 may be configured to send a touch signal 300 that communicates a detected finger touch on the trigger 302 to the force-feedback control system 334.

The user-input device 300 includes a communication subsystem 320 configured to communicatively couple the user-input device 300 with a computing device 322. The computing device 322 may take any suitable form, such as a game console, desktop computer, laptop computer, mobile computer (e.g., smartphone), augmented-reality computer, or virtual-reality computer. The communication subsystem 320 may include any suitable communication hardware to enable communication with the computing device 322 according to any suitable communication protocol (e.g., Wi-Fi, Bluetooth). The communication subsystem 320 may be configured to send various signals to communicate the state of the force-feedback trigger assembly 302 to the computing device 322. For example, the communication subsystem 320 may be configured to send the posture signal 326, the force signal 328, and/or the touch signal 330 to the computing device 322. The computing device 322 may be configured to execute an application 324, such as a video game, and the computing device 322 may use these signals to control execution of the application.

Furthermore, the communication subsystem 320 may be further configured to receive, from the computing device 322, one or more force-feedback signals 332 configured to activate the force-feedback motor 308 to drive the trigger 304. In some implementations, the force-feedback control system 334 may be configured to receive, via the communication subsystem 320, the force-feedback signal 332 from the computing device 322. In other implementations, the force-feedback control system 334 may be configured to generate the force-feedback signal 332 instead of the computing device 322. The force-feedback control system 334 may be configured to control the force-feedback motor 306 based on the force-feedback signal 332 to adjust a user-perceived state of the trigger 304 in any suitable manner. The force-feedback signal 332 may be determined from any suitable parameters, conditions, states, and/or other information. For example, the force-feedback signal may be based at least on one or more of the posture signal 326, the force signal 328, and the touch signal 330. Alternatively, or additionally, the force-feedback signal 332 may be based on a parameter of the computing device 322, such as a game parameter of a video game. Further still, the force-feedback signal 332 may be based at least on a user's preferences. For example, a user may specify a desired trigger resistance (e.g., a pull weight), and the force-feedback signal 332 may be configured to activate the force-feedback motor to provide the desired resistance. In some implementations, the computing device 322 may send other signals to the user-input device 300 to control various aspects of the user-input device. For example, in a configuration that uses an active/ electronic clutch, the computing device may send a control signal to control clutch engagement.

The force-feedback control system 334 may include any suitable hardware components to control operation of the force-feedback trigger assembly 302 and/or other components of the user-input device 300. In one example, the force-feedback control system 334 includes a microprocessor. The force-feedback control system 334 may be an example of the microcontroller 124 of FIG. 1.

In some implementations, the user-input device 300 and the computing device 322 may be incorporated into a single device. For example, the user-input device 300 and the computing device 322 may form a stand-alone handheld gaming device. In some implementations, the computational functions/operations of the user-input device 300 and the computing device 322 may be performed by a single microprocessor (e.g., force-feedback control system 334) that is integral to the user-input device 300.

In some implementations, the force-feedback control system 334 may be configured to control the force-feedback motor 306 based on one or more force-feedback definitions 336. For example, a force-feedback definition may be a data structure representing one or more resistance/assistance/ vibration profiles that may be used throughout the course of playing a video game or interacting with an application. In some implementations, the computing device 322 may send one or more force-feedback definitions 336 to the game controller 100. In other implementations, the force-feedback control system 334 may be pre-loaded with one or more force-feedback definitions 336. In some such implementations, the force-feedback control system 334 may control operation of the force-feedback motor 306 to drive the trigger 304 without being required to communicate with the computing device 322. In some implementations, the force-feedback control system 334 may continue to receive operating parameters (e.g., video game parameters) from the computing device 322 that affect how the force-feedback control system 334 uses the force-feedback definition(s) to control the force-feedback motor 306. In such implementations, since force-feedback processing is handled on-board by the force-feedback control system 334, the force feedback control loop does not depend on processing by the computing device 322. In this way, force-feedback control may be provided in a fast manner, such as fast enough to be perceived by the user substantially in real-time.

FIGS. 4-8 and 10-12 show different example force-feedback trigger assemblies that may be incorporated into a user-input device, such as the user input device 100 of FIG. 1 or the user-input device 300 of FIG. 3. FIGS. 4A-4B show an example force-feedback trigger assembly 400 in which a trigger 402 interfaces with a force-feedback motor 404 via a sector gear 406 also referred to as an arched gear. The trigger 402 is configured to pivot about a trigger axis 408 of a mounting frame 410. The mounting frame 410 may be incorporated into a housing of a user-input device to secure the trigger 402 in the user-input device. The trigger 402 pivots about the trigger axis 408 between a fully-extended posture shown in FIG. 4A and a fully-retracted posture shown in FIG. 4B. The fully-extended posture and the fully-retracted posture define the boundaries of a pivot range or range of rotation of the trigger 402.

The trigger 402 includes a finger-interface portion 412 and a motor-interface portion 414 that opposes the finger-interface portion 412. The finger-interface portion 412 is externally oriented and configured to receive an actuation force applied by a user's finger to pivot the trigger 402 away from the fully-extended posture. The motor-interface portion 414 is internally oriented and configured to interface with the force-feedback motor 404 such that the force-feedback motor 404 can drive the trigger 402 when the force-feedback motor 404 is activated. In particular, the sector gear 406 is arranged on the motor-interface portion 414 and includes a plurality of gear teeth 416 arranged on an outer, convex side of the sector gear 406. The plurality of gear teeth 416 are configured to mesh with a drive gear 418 of the force-feedback motor 404. The drive gear 418 is a rotary gear fixed on an output shaft 420 of the force-feedback motor 404. Drive gear 418 may be any suitable type of gear including a spur gear, a helical gear, a bevel gear, a crown gear, a worm gear, or an elliptical gear. In other implementations, driver gear 418 may be a drive pulley or drive sprocket that interfaces with a belt or chain. When the force-feedback motor 404 is activated, the output shaft 420 rotates the drive gear 418 that meshes with the gear teeth 416 of the sector gear 406 to drive the trigger 402. The force-feedback motor 404 may be mounted to the mounting frame 410 in a fixed position such that the force-feedback motor 404 does not move with the trigger 402 when the trigger 404 pivots about the trigger axis 408. Such a configuration may be referred to as a fixed-gear, force-feedback configuration.

A trigger return spring 422 may be configured to forward bias the trigger 402 toward the fully-extended posture. The trigger return spring 422 may take any suitable form. In the illustrated example, the trigger return spring 422 is a torsion spring wrapped around the trigger axis 408 to apply a spring force between the mounting frame 410 and the trigger 402 to forward bias the trigger 402.

The force-feedback motor 404 may be configured to rotate in a clockwise direction or a counter-clockwise direction. When the force-feedback motor 404 rotates in the clockwise direction, the drive gear 418 rotates correspondingly and drives the sector gear 406 to pivot the trigger 402 about the trigger axis 408 in a counter-clockwise direction. In this case, the trigger 402 pivots/retracts inward away from the fully-extended posture and toward the fully-retracted posture. When the force-feedback motor 404 rotates in the counter-clockwise direction, the drive gear 418 rotates correspondingly and drives the sector gear 406 to pivot the trigger 402 about the trigger axis 408 in a clockwise direction. In this case, the trigger 402 pivots/extends outward toward the fully-extended posture and away from the fully-retracted posture.

In some cases, depending on the actuation force applied by a user's finger to the finger-interface portion 412 of the trigger 402, an activation force/torque output by the force-feedback motor 404 may not actually pivot the trigger 402, and instead may provide a user-perceived resistance that opposes the actuation force of the user's finger.

A posture of the trigger 402 may be determined by a posture sensor. In the illustrated implementation, the trigger 402 includes a trough configured to retain a magnet 424 such that the magnet is coupled to the trigger 402. A Hall effect sensor may be configured to determine the posture of the trigger 402 based on the position of the magnet 424 relative to the Hall effect sensor. In one example, the determined posture is an absolute position of the trigger 402 within the pivot range of the trigger 402.

The trigger 402 may be formed from any suitable material. For example, the trigger 402 may include plastic or metal. In some implementations, the trigger 402 may be a single formed component, such as a molded plastic part or a machined metal part. In such implementations, the sector gear 406 may be integrated into the single component. In other implementations, the trigger 402 may include a plurality of components in an assembly. For example, the user-interface portion 412 and the motor-interface portion 414 may be separate components that are coupled together.

Sector gear 406 may be any suitable type of gear including a spur gear, a helical gear, a bevel gear, a crown gear, or an elliptical gear. The sector gear 406 may have any suitable arc shape including any suitable arc angle and/or arc radius. Further, the sector gear 406 may be oriented on the motor-interface portion 414 in any suitable manner to mesh with the drive gear 418. In some implementations, the plurality of gear teeth may be arranged on an interior, concave side of the sector gear 406 instead of being oriented on an outer, convex side. In such a configuration, the sector gear 406 may extend outward from the trigger 402 or the trigger 402 may form a cut-out in order to accommodate the drive gear 418. Such a configuration may be more compact relative to the illustrated example, but may also restrict the size of the motor/drive gear that may be used to drive the trigger.

The sector gear force-feedback trigger assembly provides a compact arrangement, because the sector gear can be incorporated directly into the trigger. Moreover, the drive gear of the motor may interface directly with the sector gear without requiring additional reduction gears or other intermediate gears. Although, in some implementations, the force-feedback trigger assembly may include additional gears operatively intermediate the drive gear and the sector gear.

Figure 5A:
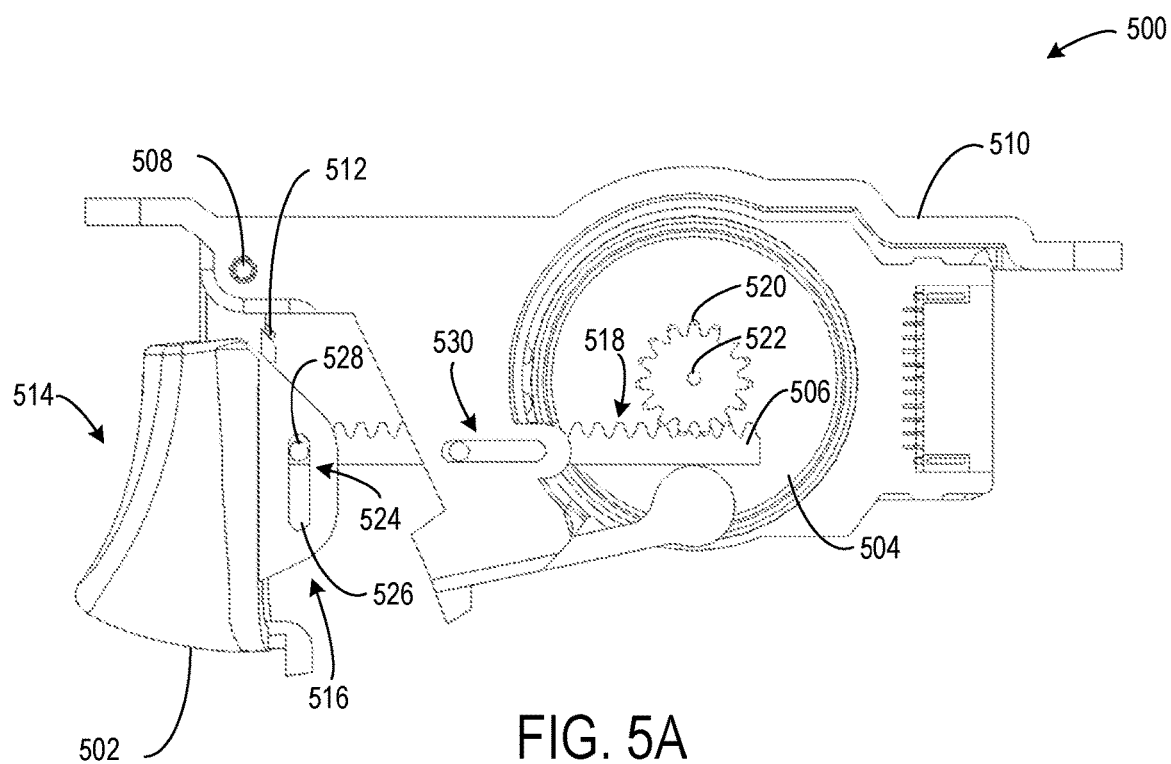
FIGS. 5A-5B show an example force-feedback trigger assembly including a rack gear interfacing with a force-feedback motor.
Figure 5B:
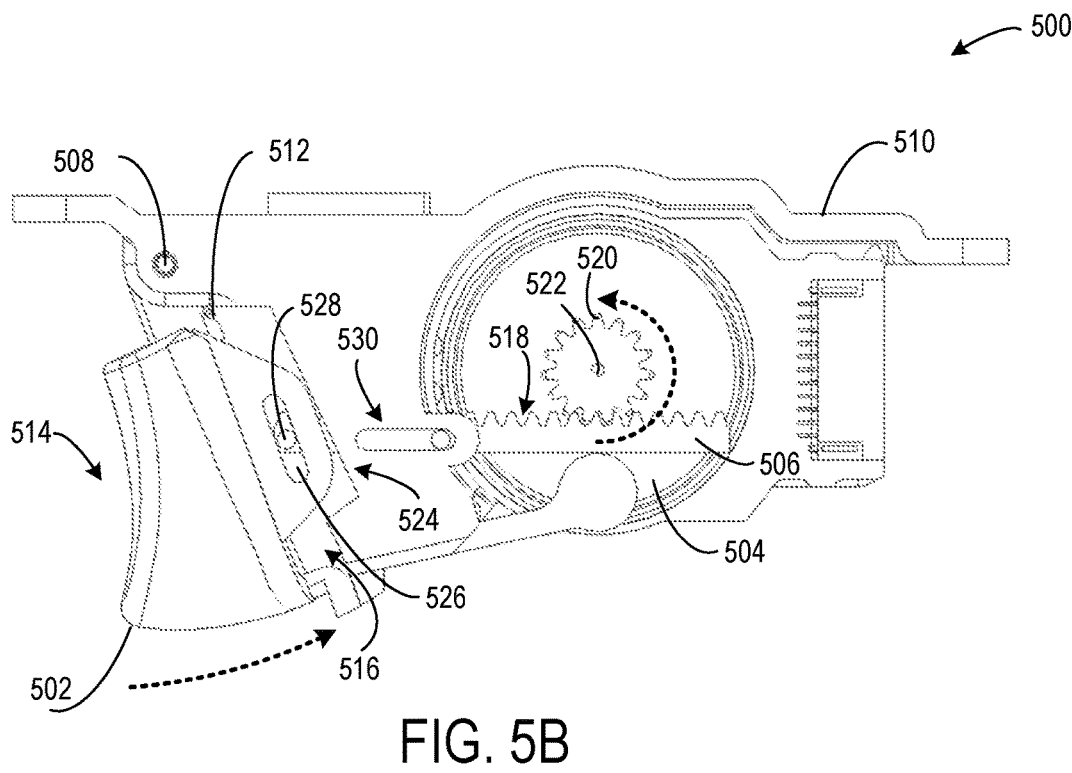

FIGS. 5A-5B show an example force-feedback trigger assembly 500 in which a trigger 502 interfaces with a force-feedback motor 504 via a rack gear 506. The trigger 502 is configured to pivot about a trigger axis 508 of a mounting frame 510. The mounting frame 510 may be incorporated into a housing of a user-input device to secure the trigger 502 in the user-input device. The trigger 502 pivots about the trigger axis 508 between a fully-extended posture shown in FIG. 5A and a fully-retracted posture shown in FIG. 5B. The fully-extended posture and the fully-retracted posture define the boundaries of a pivot range or range of rotation of the trigger 502. A trigger return spring 512 may be configured to forward bias the trigger 502 toward the fully-extended posture.

The trigger 502 includes a finger-interface portion 514 and a motor-interface portion 516 that opposes the finger-interface portion 514. The finger-interface portion 514 is externally oriented and configured to receive an actuation force applied by a user's finger to pivot the trigger 502 away from the fully-extended posture. The motor-interface portion 516 is internally oriented and configured to interface with the rack gear 506. The rack gear 506 is further configured to interface with the force-feedback motor 504 such that the force-feedback motor 504 can drive the trigger 502 when the force-feedback motor 504 is activated. In particular, the rack gear 506 includes a plurality of gear teeth 518 configured to mesh with a drive gear 520 of the force-feedback motor 504. The drive gear 518 is a pinion/rotary gear fixed on an output shaft 522 of the force-feedback motor 504 although in other implementations drive gear 520 may be any suitable type of gear including a spur gear, a helical gear, a bevel gear, a crown gear, a worm gear, or an elliptical gear. Alternatively, driver gear 520 may be a drive pulley or drive sprocket that interfaces with a belt or chain. When the force-feedback motor 504 is activated, the output shaft 522 rotates the drive gear 520 that meshes with the gear teeth 518 of the rack gear 506 to laterally translate the rack gear 506 and drive the trigger 502. In some implementations, force-feedback trigger assembly 500 may include additional gears or any other suitable torque-transferring elements such as shafts, couplings, belts and pulleys, chain and sprockets, clutches, and differentials intermediate force-feedback motor 504 and rack gear 506.

The rack gear 506 interfaces with the trigger 502 via a guided connection that allows the trigger 502 to move relative to the rack gear 506 within a designated range of movement. Such a guided connection allows the trigger 502 to remain connected to the rack gear 506 as the trigger pivots about the trigger axis 508 and the rack gear moves laterally. The trigger 502 may be guidedly connected with the rack gear 506 in any suitable manner. In the illustrated example, the trigger 502 and the rack gear 506 collectively form a pin-in-slot mechanism 524 that guidedly connects the trigger 502 with the rack gear 506. In particular, a slot 526 is formed in the motor-interface portion 516 of the trigger 502. A pin 528 extends from the rack gear 506 and into the slot 526 such that the pin 528 moves relative to the slot 526 as the trigger 502 pivots about the trigger axis 508 and the rack gear 506 laterally translates. As shown in FIG. 5A, when the trigger 502 is fully-extended, the pin 528 is positioned at a top end of the slot 526. Further, as shown in FIG. 5B, when the trigger 502 is fully-retracted, the pin 528 is positioned in a middle section of the slot 526. The slot 526 may be sized to accommodate any suitable pivot range of the trigger 502 and/or amount of lateral translation of the rack gear 506.

In other implementations, the slot may be formed in the rack gear and the pin may be formed by the trigger to collectively form a pin-in-slot mechanism that is functionally equivalent.

An additional pin-in-slot mechanism 530 is collectively formed by the rack gear 506 and the mounting frame 510. This pin-in-slot mechanism 530 may guidedly connect the rack gear 506 with the frame 510 to provide additional stability to the rack gear 506 as it translates laterally to drive the trigger 502. As shown in FIG. 5A, when the trigger 502 is fully-extended, the rack gear 506 is translated forward such that the pin is positioned at a front end of the slot. Further, as shown in FIG. 5B, when the trigger 502 is fully-retracted, the rack gear 506 is translated backward such that the pin is positioned in a middle section of the slot.

The force-feedback motor 504 may be configured to rotate in a clockwise direction or a counter-clockwise direction. When the force-feedback motor 504 rotates in the clockwise direction, the drive gear 520 rotates correspondingly and drives the rack gear 506 forward to pivot the trigger 502 about the trigger axis 508 in a clockwise direction. In this case, the trigger 502 pivots/extends outward toward the fully-extended posture and away from the fully-retracted posture. When the force-feedback motor 504 rotates in the counter-clockwise direction, the drive gear 520 rotates correspondingly and drives the rack gear 506 backwards to pivot the trigger 502 about the trigger axis 508 in a counter-clockwise direction. In this case, the trigger 502 pivots/retracts inward away from the fully-extended posture and toward the fully-retracted posture.

In some cases, depending on the actuation force applied by a user's finger to the finger-interface portion 514 of the trigger 502, an activation force/torque output by the force-feedback motor 504 may not actually pivot the trigger 502, and instead may provide a user-perceived resistance that opposes the actuation force of the user's finger.

In some implementations, the rack gear may be forward-biased toward the user-actuatable trigger. For example, a rack return spring may be operatively intermediate the mounting frame 510 and the rack gear 506. The rack return spring may be configured to forward bias the rack gear 506 to interface with the trigger 502 and further forward bias the trigger 502 toward the fully-extended posture. The rack return spring may help speed up a return response of the trigger 502 to the fully-extended posture when the user's finger is lifted from the trigger 502. In some cases, the spring force of the rack return spring may be greater than a drag of the motor/gear on the trigger 502. In some such implementations, the trigger return spring 512 may be omitted in favor of the rack return spring.

In some implementations, the rack gear 506 may not connect to the trigger 502, but instead may abut against the trigger. In such implementations, the rack gear 506 may drive the trigger 502 only in the forward direction based on activation of the force-feedback motor 504. In this way, the rack gear 504 can provide user-perceived resistance and return assistance to the trigger 502. However, the rack gear 506 would be unable to retract/pivot the trigger 502 toward the fully-retracted posture without actuation force provided by the user's finger.

Furthermore, in some such implementations, the force-feedback motor 504 may be configured to selectively drive the rack gear 506 to a position where the rack gear 506 does not interface with the trigger 502 during any point in the pivot range of the trigger 502. In other words, the rack gear 504 may be positioned to provide no force-feedback to the trigger 502 (and no drag from the motor/gears). Instead, the trigger 502 is only subject to the forward bias of the trigger return spring 508 and the actuation force of the user's finger. Such a configuration may be preferred by some users that do not want force feedback from the trigger. This is one of many different settings that may be provided to cater to the individual preferences of different users.

The rack gear force-feedback trigger assembly may provide force feedback in a quiet and stable manner, because the rack gear translates laterally and is additionally stabilized by the mounting frame.

FIGS. 6A-6D show an example force-feedback trigger assembly 600 in which a trigger 602 interfaces with a force-feedback motor 604 via a rack gear 606 and an adjustable tension trigger return spring 608. The trigger 602 is configured to pivot about a trigger axis 610 of a mounting frame 610. The mounting frame 610 may be incorporated into a housing of a user-input device to secure the trigger 602 in the user-input device. The trigger 602 pivots about the trigger axis 610 between a fully-extended posture shown in FIGS. 6A and 6C and a fully-retracted posture shown in FIGS. 6B and 6D. The fully-extended posture and the fully-retracted posture define the boundaries of a pivot range or range of rotation of the trigger 602.

The trigger return spring 608 is operatively intermediate the 602 trigger and the rack gear 606. In some implementations, the trigger return spring 608 may be incorporated into the rack gear 606. For example, the rack gear 606 may include a telescoping portion that houses the trigger return spring 608. In other implementations, the trigger return spring 608 may be separate from the rack gear 606 and coupled to the rack gear 606.

The trigger return spring 608 interfaces with the trigger 602 via a guided connection that allows the trigger 602 to move relative to the trigger return spring 608 within a designated range of movement. Such a guided connection allows the trigger 602 to pivot about the trigger axis 610 based on lateral translation of the rack gear 606 that drives the trigger 602. The trigger 602 may be guidedly connected with the trigger return spring 608 in any suitable manner. In the illustrated example, the trigger 602 and the trigger return spring 608 collectively form a pin-in-slot mechanism 614 that guidedly connects the trigger 602 with the trigger return spring 608. In particular, a slot 616 is formed in a motor-interface portion 618 of the trigger 602. A pin 620 extends from the trigger return spring 608 and into the slot 620 such that the pin 620 moves relative to the slot 616 as the trigger 602 pivots about the trigger axis 610 and the trigger return spring 608/rack gear 606 translates laterally. The slot 616 may be positioned on the motor-interface portion 618 such that the slot 616 is spaced apart from the trigger axis 610 to allow for a great enough range of travel of the pin 620 within the slot 616 to allow the trigger 602 to pivot. For example, the slot 616 may be positioned on a portion of the trigger 602 that opposes the trigger axis 610.

Figure 6A:
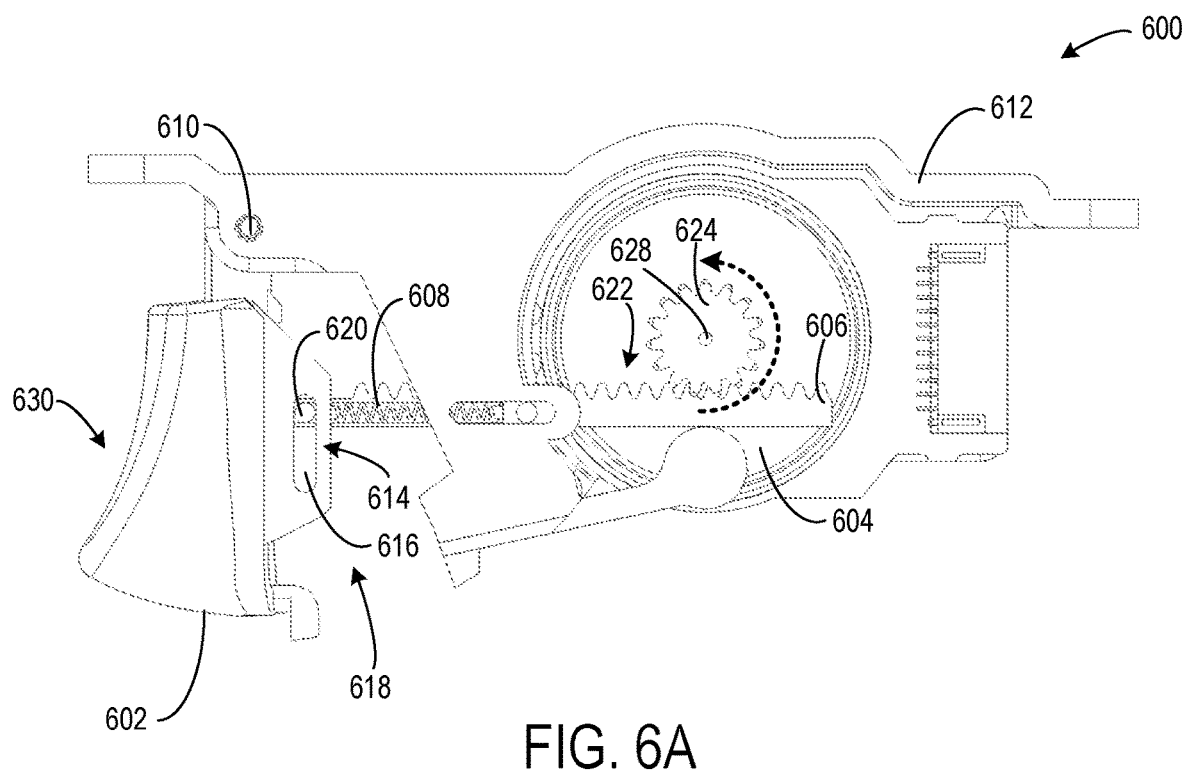
FIGS. 6A-6D show an example force-feedback trigger assembly including an adjustable trigger return spring interfacing with a force-feedback motor via a rack gear.
Figure 6B:
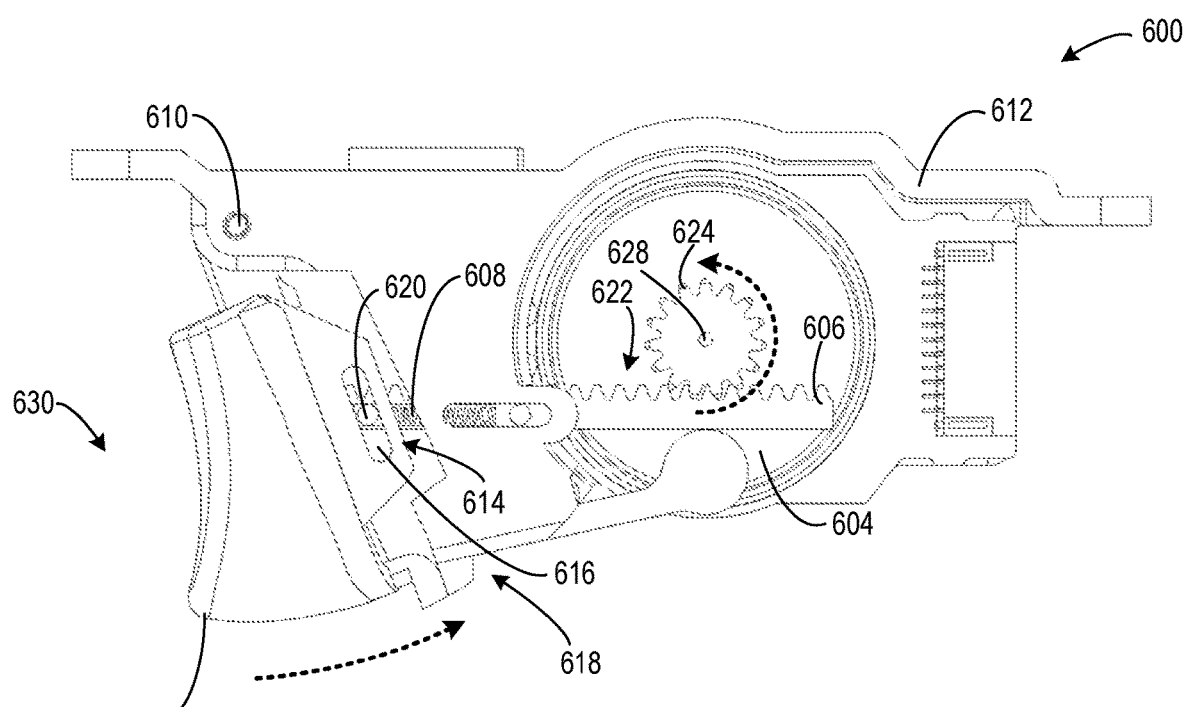
Figure 6C:
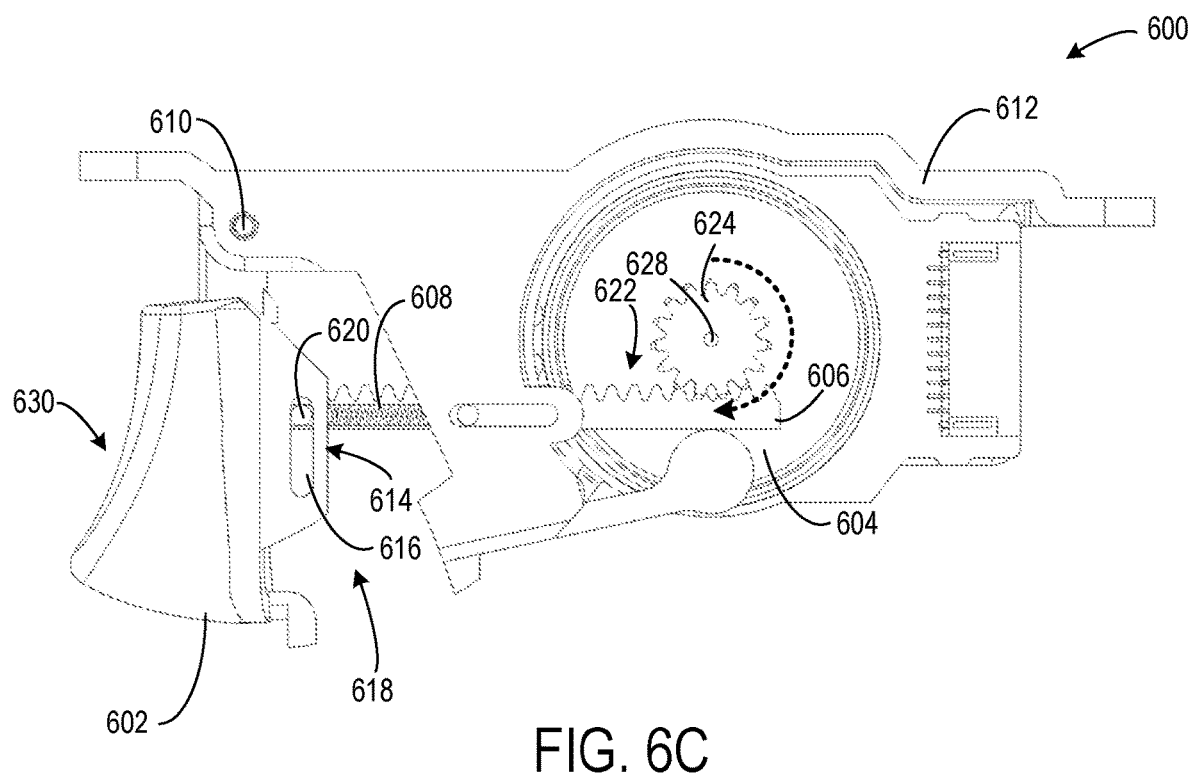
Figure 6D:
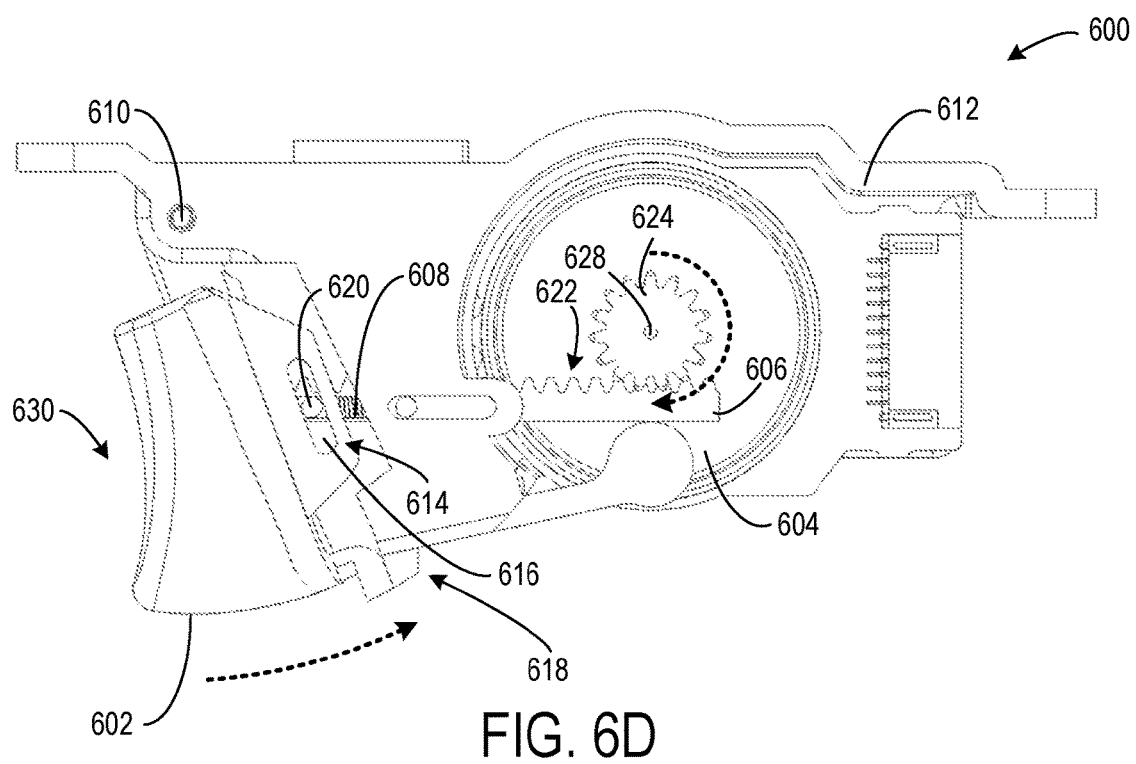

The trigger return spring 608 is configured to forward bias the trigger 602 toward the fully-extended posture. A spring force applied to the trigger 602 by the trigger return spring 608 may be dynamically adjusted based on a position of the rack gear 606 that may be driven by the force-feedback motor 604. As shown in FIGS. 6A and 6B, the rack gear 606 is laterally translated backward away from the trigger 602. This position of the rack gear 606 allows the trigger return spring 608 to expand, and thus reduces the spring force applied to the trigger 602. As shown in FIGS. 6C and 6D, the rack gear 606 is laterally translated forward toward the trigger 602. This position of the rack gear 606 compresses the trigger return spring 608, and thus increases the spring force applied to the trigger 602.

The force-feedback motor 604 is configured to drive the rack gear 606 to adjust the spring force applied to the trigger 602 by the trigger return spring 608. In particular, the rack gear 606 includes a plurality of gear teeth 622 configured to mesh with a drive gear 624 of the force-feedback motor 604. The drive gear 624 is a pinion/rotary gear fixed on an output shaft 626 of the force-feedback motor 604. When the force-feedback motor 604 is activated, the output shaft 626 rotates the drive gear 624 that meshes with the gear teeth 622 of the rack gear 606 to laterally translate the rack gear 606 and adjust the spring tension of the trigger return spring 608. Moreover, the force-feedback motor 604 may be configured to, in some cases, drive the rack gear 606 to provide a force/resistance greater than the spring force of the trigger return spring 608. For example, the force-feedback motor 604 may drive the rack gear 606 to provide a hard stop at a designated posture within the pivot range of the trigger 602. The hard stop does not allow an actuation force applied by the user's finger to easily retract/pivot the trigger 602 beyond the designated posture of the hard stop.

The force-feedback motor 604 may be configured to rotate in a clockwise direction or a counter-clockwise direction. When the force-feedback motor 604 rotates in the clockwise direction, the drive gear 624 rotates correspondingly and drives the rack gear 606 forward to compress the trigger return spring 608 and/or pivot the trigger 602 about the trigger axis 610 in a clockwise direction. As shown in FIGS. 6A and 6B, the rack gear 606 is translated forward to compress the trigger return spring 608. As such, the activation force required by the user's finger to retract the trigger 602 from the fully-extended posture in FIG. 6A to the retracted posture in FIG. 6B is higher.

When the force-feedback motor 604 rotates in the counter-clockwise direction, the drive gear 624 rotates correspondingly and drives the rack gear 606 backwards to allow the trigger return spring 608 to expand and/or pivot the trigger 602 about the trigger axis 610 in a counter-clockwise direction. As shown in FIGS. 6C and 6D, the rack gear 606 is translated backward to allow the trigger return spring 608 to expand. As such, the activation force required by the user's finger to retract the trigger 602 from the fully-extended posture in FIG. 6C to the retracted posture in FIG. 6D is lower.

The adjustable spring tension force-feedback assembly allows the trigger return tension/spring bias to be adjusted at a highly granular level to cater to the individual preferences of different users. Moreover, the trigger return tension may be adjusted in a manner that is power efficient, because the force-feedback motor only needs to be activated to drive the rack gear to maintain the desired position for the desired tension/spring. In this way, battery power consumption may be reduced. Although the force-feedback motor may be activated to provide other user-perceived force feedback effects as desired.

Figure 7A:
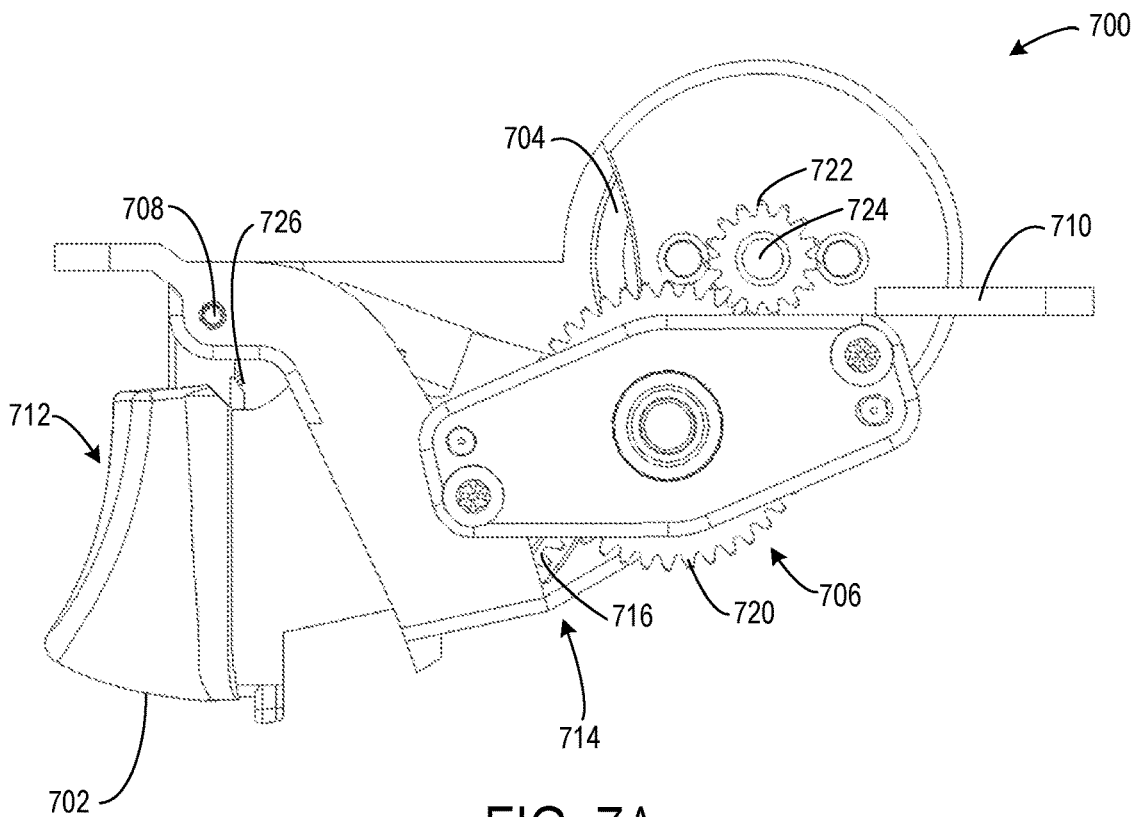
FIGS. 7A-7B show an example force-feedback trigger assembly including a clutch operatively intermediate a user-actuatable trigger and a force-feedback motor.
Figure 7B:
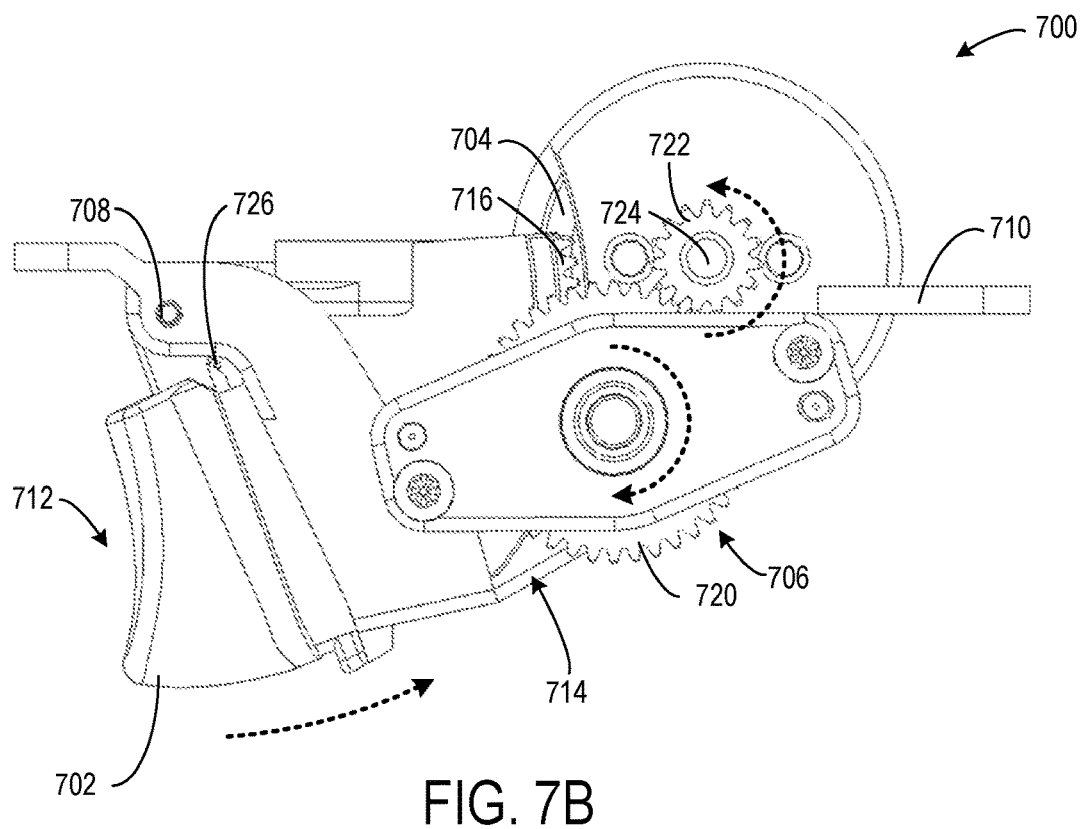
Figure 8:
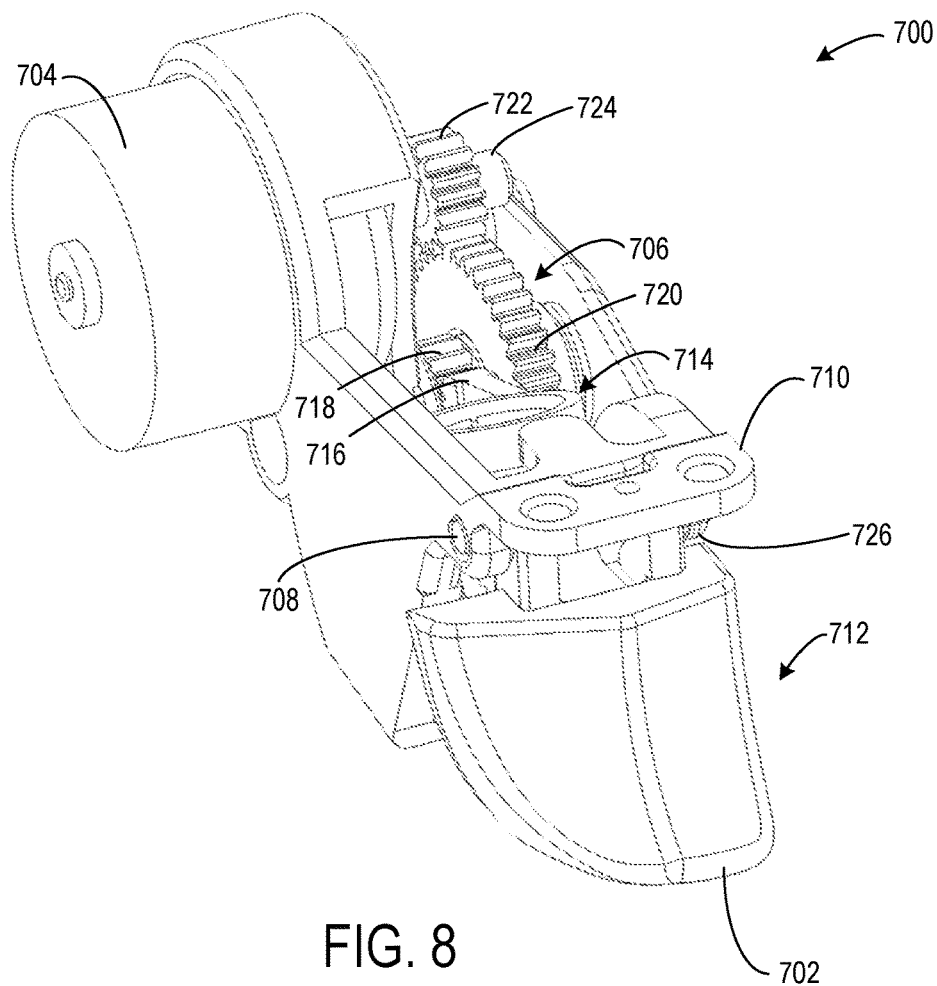
FIG. 8 shows a perspective view of the force-feedback trigger assembly of FIGS. 7A-7B.

FIGS. 7A, 7B, and 8 show an example force-feedback trigger assembly 700 in which a trigger 702 interfaces with a force-feedback motor 704 via a clutch 706. The trigger 702 is configured to pivot about a trigger axis 708 of a mounting frame 710. The mounting frame 710 may be incorporated into a housing of a user-input device to secure the trigger 702 in the user-input device. The trigger 702 pivots about the trigger axis 708 between a fully-extended posture shown in FIG. 7A and a fully-retracted posture shown in FIG. 7B. The fully-extended posture and the fully-retracted posture define the boundaries of a pivot range or range of rotation of the trigger 702.

The trigger 702 includes a finger-interface portion 712 and a motor-interface portion 714 that opposes the finger-interface portion 712. The motor-interface portion 414 includes a sector gear 716 configured to mesh with a smaller gear 718 (shown in FIG. 8) of the clutch 706. The clutch 706 further includes a larger gear 720 configured to mesh with a drive gear 722 of the force-feedback motor 704. The drive gear 722 is fixed on an output shaft 724 of the force-feedback motor 704. When the force-feedback motor 704 is activated, the output shaft 724 rotates the drive gear 720 that drives the larger gear of the clutch 706.

The clutch 706 is configured to mechanically change engagement between the trigger 702 and the force-feedback motor 704. When the force-feedback motor 704 is activated and the clutch 706 engages the force-feedback motor 704 with the trigger 702, the force-feedback motor 704 drives the clutch 706, and the clutch 706 drives the trigger 702 to adjust a user-perceived state (e.g., resistance, hard stop, vibration) of the trigger 702. When the force-feedback motor 704 is activated and the clutch 706 disengages the force-feedback motor 704 from the trigger 702, the force-feedback motor 704 drives the clutch 706, and the clutch 706 does not drive the trigger 702. When the force-feedback motor 704 is not activated and the clutch 706 disengages the force-feedback motor 704 from the trigger 702, the clutch 706 lessens or mitigates a drag of the force-feedback motor 704 from the trigger 702. In this way, the trigger 702 may pivot freely (with spring bias) without the force-feedback motor 704 affecting the motion response of the trigger 702.

Note that although the clutch 706 may change engagement between the force-feedback motor 704 and the trigger 702, the clutch 706 remains physically coupled to the force-feedback motor 704 and the trigger 702 via the larger and smaller gears of the clutch 706.

A trigger return spring 726 may be configured to forward bias the trigger 702 toward the fully-extended posture. The trigger return spring 726 may take any suitable form. In the illustrated example, the trigger return spring 726 is a torsion spring wrapped around the trigger axis 708 to apply a spring force between the mounting frame 710 and the trigger 702 to forward bias the trigger 702.

The force-feedback motor 704 may be configured to rotate in a clockwise direction or a counter-clockwise direction. When the force-feedback motor 704 rotates in the clockwise direction and the clutch 706 is engaged, the drive gear 722 rotates correspondingly and drives the sector gear 716 to pivot the trigger 702 about the trigger axis 708 in a counter-clockwise direction. In this case, the trigger 402 pivots/retracts inward away from the fully-extended posture and toward the fully-retracted posture. When the force-feedback motor 704 rotates in the counter-clockwise direction and the clutch 706 is engaged, the drive gear 722 rotates correspondingly and drives the sector gear 716 to pivot the trigger 702 about the trigger axis 708 in a clockwise direction. In this case, the trigger 702 pivots/extends outward toward the fully-extended posture and away from the fully-retracted posture.

In some cases, depending on the actuation force applied by a user's finger to the finger-interface portion 712 of the trigger 402, an activation force/torque output by the force-feedback motor 704 may not actually pivot the trigger 702, and instead may provide a user-perceived resistance that opposes the actuation force of the user's finger.

In some implementations, the clutch 706 may be a one-way clutch configured to disengage the trigger 702 from the force-feedback motor 704 when the trigger 702 pivots in a forward direction toward the fully-extended posture. The one-way clutch may automatically lessen or mitigate the drag of the force-feedback motor 704 from the trigger 702 whenever the user's finger lifts from the finger-interface portion 712 and/or reduces actuation force on the trigger 702 below a threshold actuation force. When the motor drag is lessened or mitigated from the trigger 702 by the clutch 706, the trigger 702 pivots in the forward direction due to the forward bias of the trigger return spring 726 with less drag from the motor. In this way, the trigger 702 may have a fast response rate to return to the fully-extended posture.

Figure 9:
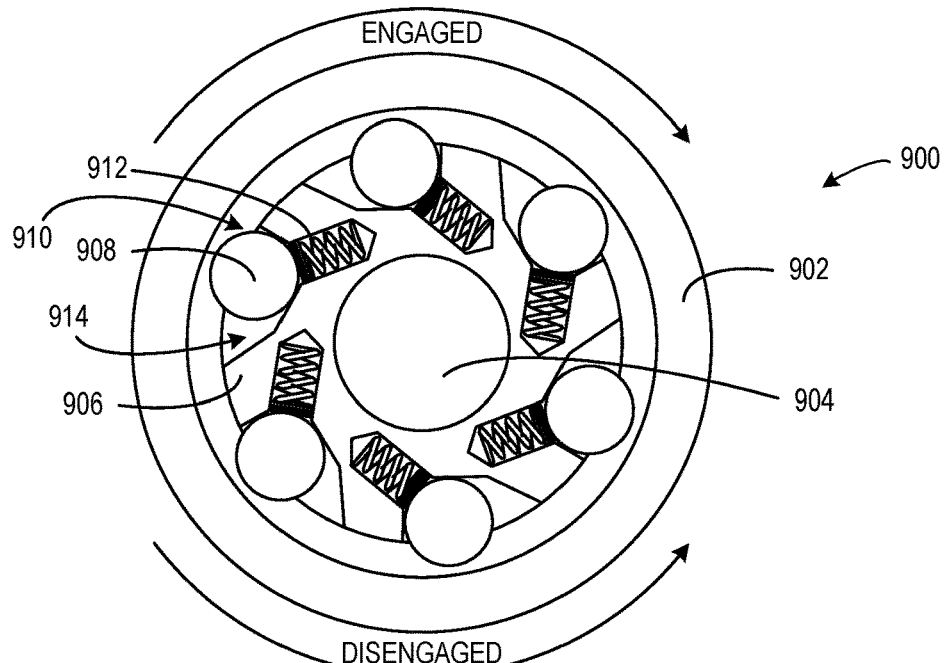
FIG. 9 shows an example one-way clutch that may be incorporated into a force-feedback trigger assembly.

FIG. 9 shows a cross-sectional view of an example one-way clutch 900 that may be implemented in a force-feedback trigger assembly, such as assembly 700 of FIGS. 7A, 7B, and 8. The one-way clutch 900 includes a larger gear 902 and a smaller gear 904 separated by an intermediate slip structure 906. The slip structure 906 is fixed to the smaller gear 904 and selectively engages the larger gear 902. A plurality of ball bearings 906 are arranged around a circumference of the slip structure 906. In particular, each ball bearing 906 is situated in a corresponding cavity 910 formed in the slip structure 906. Each ball bearing 906 is biased outward by an associated spring 912 that is positioned underneath the ball bearing 906 in the cavity 910 such that the ball bearing contacts the larger gear 902.

According to this configuration, when the larger gear 902 rotates clockwise, the larger gear 902 traps the ball bearings 906 against a sidewall of the cavity 910 that causes the slip structure 906 and correspondingly the smaller gear 904 to remain fixed relative to the larger gear 902. As such, the smaller gear 904 and the larger gear 902 may rotate clockwise together. When the larger gear 902 rotates counter-clockwise, the larger gear 902 presses the ball bearings 906 into an adjacent free space 914 in the cavity 910 such that the ball bearings do not engage the slip structure 906 with the larger gear 902. As such, the larger gear 902 may rotate counter-clockwise, and the smaller gear 904 may remain still.

The one-way clutch 900 is provided as an example and is meant to be non-limiting. In other implementations, the one-way clutch may include rollers or gears instead of ball bearings. In a geared configuration, the springs may be omitted in favor of a planetary gear arrangement that forces floating planetary gears into the larger gear in order to engage the smaller gear with the larger gear.

In some implementations clutch 706 may be a slip clutch, rotary friction clutch, or breakaway clutch such that clutch 706 transfers torque between force feedback motor 704 and trigger 702 under normal operation, but if the torque exceeds a certain threshold the clutch slips and only the threshold torque, or no torque, is transferred until the torque drops below the threshold. In this way, the clutch protects force feedback motor 704, trigger 702, and any intermediate components by limiting the maximum force/torque that these components must bear—for example from the game controller being dropped on the trigger or being roughly handled by a user.

In some implementations, the clutch may be an active/electronic clutch configured to change engagement between the trigger and the force-feedback motor based on a control signal. For example, the control signal may be provided by a computing device in communication with the user-input device to adjust a user-perceived state of the trigger.

Clutch 706 may take any suitable form to engage and disengage force feedback motor 704 from trigger 702. In one example implementation, an inner rotary portion of clutch 706 attaches to a shaft and an outer rotary portion of clutch 706 has gear teeth. Of the shaft and the gear, one interfaces with sector gear 716, a rack gear that engages with trigger 702, or an intermediate gear or belt and the other interfaces with the shaft of force feedback motor 704, drive gear 722, or an intermediate gear or belt. In one such implementation, drive gear 722 is composed of clutch 706 and the inner rotary portion of clutch 706 engages directly with the shaft of force feedback motor 704. In another implementation, clutch 706 engages and disengages two rotatable shafts one of which interfaces to force feedback motor 704 and one of which interfaces to trigger 702.

In one example implementation, clutch 706 is comprised of at least two gears one of which interfaces with force feedback motor 704 and one of which interfaces with trigger 702. Clutch 706 engages and disengages force feedback motor 704 from trigger 702 by adjusting the relative position of the two gears by switching between a state in which the gear teeth interface and force feedback motor 704 and trigger 702 are engaged and a state in which the gear teeth do not interface and force feedback motor 704 and trigger 702 are disengaged. The gears may be switched between interfacing and not interfacing either by translating relative to each other along the axis of rotation of one of the gears or by translating relative to each other normal to the axis of rotation of one of the gears.

Figure 10A:
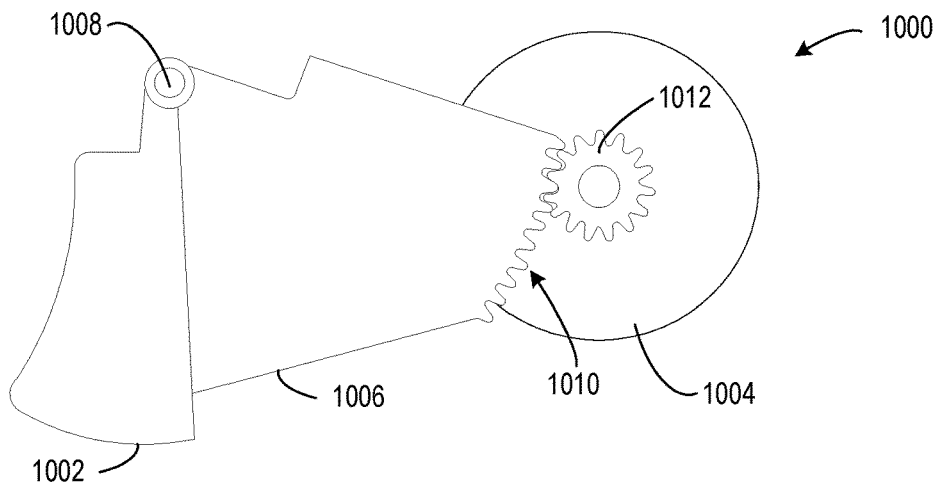
FIGS. 10A-10B show an example force-feedback trigger assembly including a sector gear that moves separately from a user-actuatable trigger.
Figure 10B:
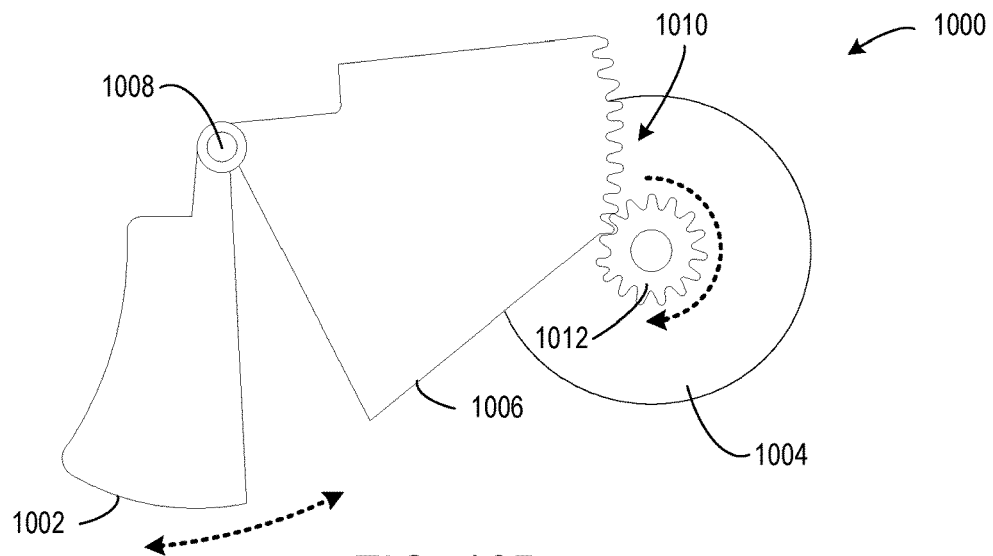

FIGS. 10A-10B show an example force-feedback trigger assembly 1000 in which a trigger 1002 interfaces with a force-feedback motor 1004 via a sector gear 1006 that moves separately from the trigger 1002. The trigger 1002 is configured to pivot about a trigger axis 1008 between a fully-extended posture and a fully-retracted posture. The fully-extended posture and the fully-retracted posture define the boundaries of a pivot range or range of rotation of the trigger 1002.

The sector gear 1006 is configured to pivot about the trigger axis 1008 separately from the trigger 1002. The sector gear 1006 is configured to interface with the force-feedback motor 1004 such that the force-feedback motor 1004 can drive the user-actuatable trigger 1002 via the sector gear 1006 when the force-feedback motor 1004 is activated. In particular, the sector gear 1006 includes a plurality of gear teeth 1010 arranged on an outer, convex side of the sector gear 1006. The plurality of gear teeth 1010 are configured to mesh with a drive gear 1012 of the force-feedback motor 1004. When the force-feedback motor 1004 is activated, the drive gear 1012 rotates and meshes with the gear teeth 1010 of the sector gear 1006 to drive the trigger 1002.

In the depicted implementation, the sector gear 1006 is not locked against the trigger 1002, but may abut against the trigger as shown in FIG. 10A. In such implementations, the sector gear 1006 may drive the trigger 1002 only in the forward direction based on activation of the force-feedback motor 1004. In this way, the sector gear 1004 can provide user-perceived resistance and return assistance to the trigger 1002. However, the sector gear 1006 would be unable to retract/pivot the trigger 1002 toward the fully-retracted posture without actuation force provided by the user's finger.

As shown in FIG. 10B, the force-feedback motor 1004 may be configured to selectively drive the sector gear 1006 to a position where the sector gear does not interface with the trigger 1002 during any point in the pivot range of the trigger 1002. In other words, the sector gear 1006 may be positioned to provide no force-feedback to the trigger 1002 (and no drag from the motor/gears). Instead, the trigger 1002 may be subject to the forward bias of a trigger return spring (when included) and the actuation force of the user's finger. Such a configuration may be preferred by some users that do not want force feedback from the trigger. This is one of many different settings that may be provided to cater to the individual preferences of different users.

Figure 11:
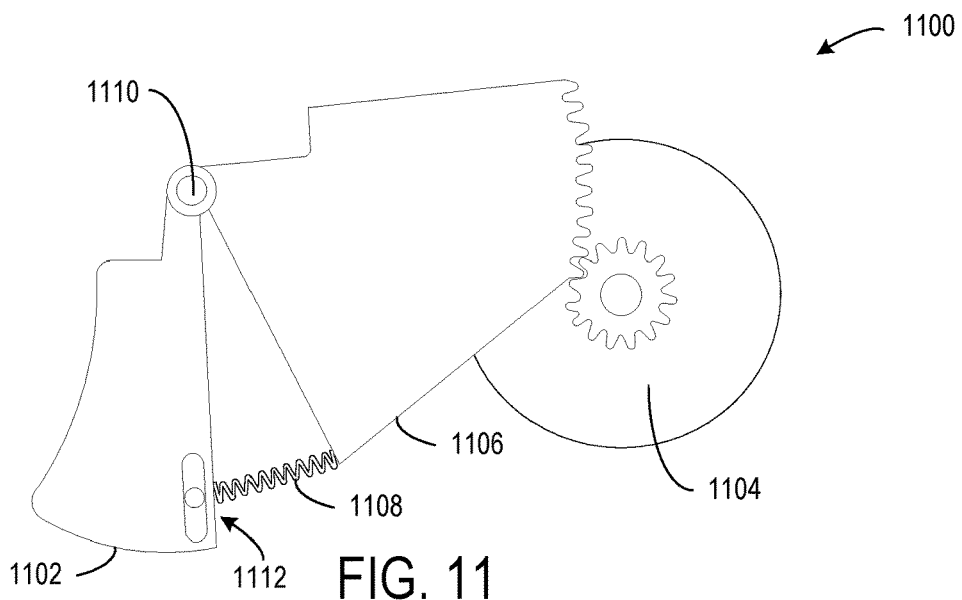
FIG. 11 shows an example force-feedback trigger assembly including an adjustable trigger return spring interfacing with a force-feedback motor via a sector gear.

FIG. 11 shows an example force-feedback trigger assembly 1100 in which a trigger 1102 interfaces with a force-feedback motor 1104 via a sector gear 1106 and an adjustable tension trigger return spring 1108. The trigger 1102 is configured to pivot about a trigger axis 1110. The trigger 1102 pivots about the trigger axis 1110 between a fully-extended posture and a fully-retracted posture. The fully-extended posture and the fully-retracted posture define the boundaries of a pivot range or range of rotation of the trigger 1102.

The trigger return spring 1108 is operatively intermediate the 1102 trigger and the sector gear 1106. The trigger return spring 1108 interfaces with the trigger 1102 via a guided connection that allows the trigger 1102 to move relative to the trigger return spring 1108 within a designated range of movement. Such a guided connection allows the trigger 1102 to pivot about the trigger axis 1110 based on rotation of the sector gear 1106 that drives the trigger 1102. The trigger 1102 may be guidedly connected with the trigger return spring 1108 in any suitable manner. In the illustrated example, the trigger 1102 and the trigger return spring 1108 collectively form a pin-in-slot mechanism 1112 that guidedly connects the trigger 1102 with the trigger return spring 1108.

The trigger return spring 1108 is configured to forward bias the trigger 1102 toward the fully-extended posture. A spring force applied to the trigger 1102 by the trigger return spring 1108 may be dynamically adjusted based on a position of the arched gear 1106 that may be driven by the force-feedback motor 1104. For example, the force-feedback motor 1104 may drive the sector gear 1106 to pivot counter-clockwise away from the fully-extended posture of the trigger 1102 that allows the trigger return spring 1108 to expand, and thus reduces the spring force applied to the trigger 1102. On the other hand, the force-feedback motor 1104 may drive the sector gear 1106 to pivot clockwise, compresses the trigger return spring 1108, and thus increases the spring force applied to the trigger 1102.

The adjustable spring tension force-feedback assembly allows the trigger return tension/spring bias to be adjusted at a highly granular level to cater to the individual preferences of different users. Moreover, the trigger return tension may be adjusted in a manner that is power efficient, because the force-feedback motor only needs to be activated to maintain the desired position for the desired tension/spring. In this way, battery power consumption may be reduced. Although the force-feedback motor may be activated to provide other user-perceived force feedback effects as desired.

Figure 12:
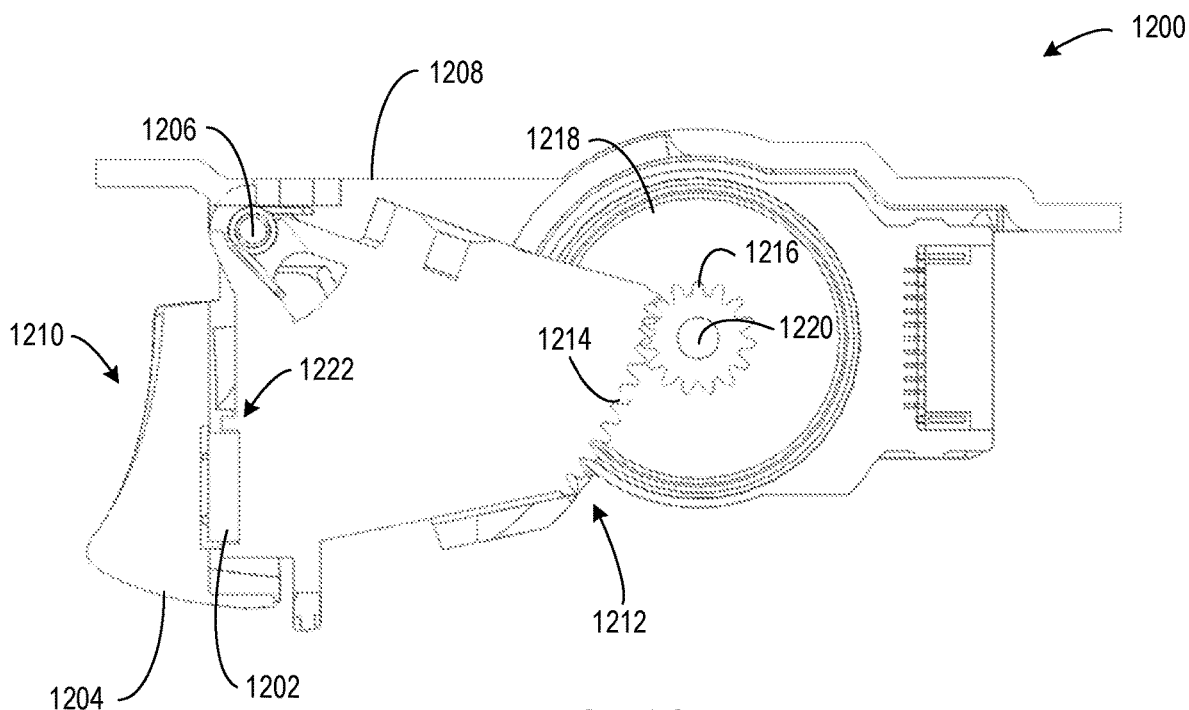
FIG. 12 shows an example force-feedback trigger assembly including a force sensor.

FIG. 12 shows an example trigger assembly 1200 including a force sensor 1202 configured to determine an actuation force applied to a trigger 1204 by a user's finger. The trigger 1204 is configured to pivot about a trigger axis 1206 of a mounting frame 1208. The mounting frame 1208 may be incorporated into a housing of a user-input device to secure the trigger 1204 in the user-input device. The trigger 1204 pivots about the trigger axis 1206. The trigger 1204 includes a finger-interface portion 1210 and a motor-interface portion 1212 that opposes the finger-interface portion 1212. The motor-interface portion 1212 includes a sector gear 1214 configured to mesh with a drive gear 1216 of a force-feedback motor 1218. The drive gear 1216 is fixed on an output shaft 1220 of the force-feedback motor 1218. When the force-feedback motor 1218 is activated, the output shaft 1220 rotates the drive gear 1216 that drives the sector gear 1214 to pivot the trigger 1204.

The force sensor 1202 is operatively intermediate the finger-interface portion 1210 and the motor-interface portion 1212. For example, the finger-interface portion 1210 and the motor-interface portion 1212 may collectively form a cavity 1222 to hold the force sensor 1202. The finger-interface portion 1210 may rotate separately from the motor-interface portion 1212. As such, when an actuation force is applied to the finger-interface portion 1210 by a user's finger, the finger-interface portion 1210 compresses the force sensor 1202 against the motor-interface portion 1212, and the force sensor 1202 determines the actuation force.

The force sensor 1202 may take any suitable form. In some implementations, the force sensor 1202 may include a strain gauge or deformable diaphragm that is used to determine force. In other implementations, the force sensor 1202 may include a pair of capacitive plates that are configured to capacitively determine the actuation force based on a distance between the capacitive plates. In yet other implementations, piezo-electric material, an electro-active polymer, or a force-sensitive resistive material that electrically responds to pressure may be used Furthermore, in some implementations, the force sensor 1202 may take other forms and may be positioned elsewhere in the force-feedback trigger assembly 1200. For example, the force sensor may include a torque gauge operatively intermediate the force-feedback motor 1218 and the trigger 1204. In one example, the torque gage may be positioned on the output shaft 1220 or an axle of an intermediate reduction gear when it is included in the assembly. In yet another example since generally the instantaneous torque output of an electric motor is proportional to its instantaneous current draw, the force sensor may include a current monitoring device configured to determine the actuation force based on a motor current of the force-feedback motor 1218.

In the force-feedback trigger assembly 1200, because the force-feedback motor 1218 has a fixed gear relationship with the trigger 1204, a drag of the forced-feedback motor 1218 and the intermediate gear train is applied to the trigger 1204 when the motor 1218 is not activated (e.g., being powered). This causes the trigger 1204 to also have a slow return rate to the fully-extended posture when the user's finger reduces an actuation force applied to the finger-interface portion 1210. This also requires the user to press on the finger-interface portion 1210 of the trigger 1204 with a greater actuation force in order overcome the motor drag when actuating the trigger 1204.

By implementing the force sensor 1202 in the trigger assembly 1000, the actuation force determined by the force sensor 1202 may be used to recognize if the user is attempting to actuate or release the trigger 1204. This recognition allows the force-feedback motor 1218 to be activated in a timely manner to pivot the trigger 1204 in the forward direction toward the fully-extended posture. For example, the force-feedback motor may drive the trigger toward the fully-extended posture based on the actuation force becoming less than a threshold force. In this way, the fixed gear assembly 1200 may provide a quick return rate of the trigger 1204 to the fully-extended posture. Moreover, the actuation force determined by the force sensor 1002 may be used to activate the force-feedback motor 1218 to provide other real-time, force-feedback effects.

It will be appreciated that any of the features of the above described force-feedback trigger assemblies may be combined in other implementations.

Figure 13:
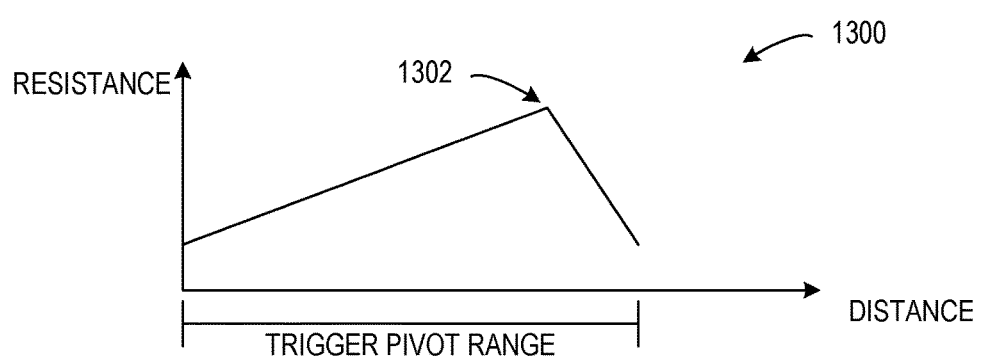
FIG. 13 shows an example user-perceived resistance profile for a user-actuatable trigger.
Figure 14:
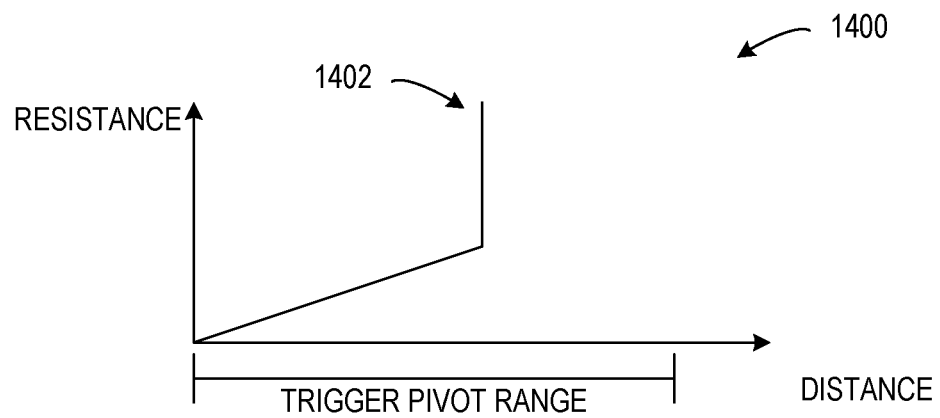
FIG. 14 shows an example user-perceived resistance profile including a hard stop for a user-actuatable trigger.
Figure 15:
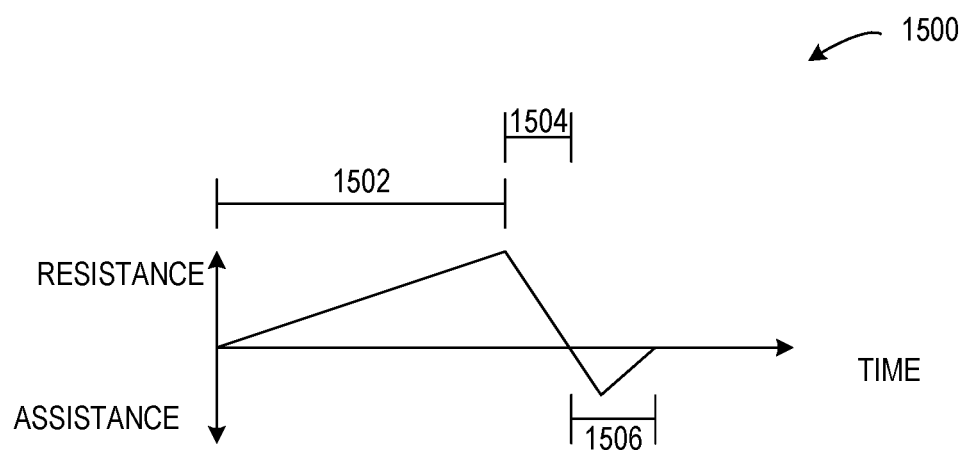
FIG. 15 shows an example user-perceived resistance and assistance profile for a user-actuatable trigger.

The above described force-feedback trigger assemblies may enable a user-input device to adjust a user-perceived state of a trigger, and the adjustments may change over the course of a pivot range of the trigger. FIGS. 13-15 show different example user-perceived trigger state profiles that may be enabled by the above described force-feedback trigger assemblies. FIG. 13 shows an example user-perceived resistance profile 1300 for a user-actuatable trigger. The resistance profile 1300 is plotted on a graph of trigger resistance versus distance of travel/pivot/rotation of the trigger. The resistance profile 1300 characterizes a trigger resistance that is provided over the course of the entire pivot range of the trigger. The origin of the distance axis corresponds to the fully-extended posture of the trigger. In the illustrated example, as the trigger retracts away from the fully-extended posture and toward the fully-retracted posture at the other end of the pivot range, the resistance applied to the trigger to oppose the actuation force applied by the user's finger increases linearly until a designated posture 1302. Once the trigger reaches the designated posture 1302, the resistance decreases sharply in a leaner manner for the remainder of the pivot range until the trigger reaches the fully-retracted posture.

The resistance profile 1300 may be enabled by activating the force-feedback motor based on a force-feedback signal that is provided by a computing device in communication with the user-input device. The force-feedback signal may be based at least on a posture of the trigger and/or an actuation force applied to the trigger by the user's finger. The posture of the trigger may be determined by a posture sensor of the user-input device and sent to the computing device. The actuation force may be determined by a force sensor of the user-input device and sent to the computing device.

The resistance profile 1300 simulates a trigger pull of a real-world gun that may be simulated in a video game executed by the computing device. In particular, the posture 1302 at which the resistance is greatest may correspond to a point in the trigger pull at which a hammer drops to fire the real-world gun. In other words, the resistance profile 1300 mimics the "click" of a gun.

FIG. 14 shows another example user-perceived resistance profile 1400 including a hard stop for a user-actuatable trigger. In this resistance profile, as the trigger retracts away from the fully-extended posture and toward the fully-retracted posture at the other end of the pivot range, the resistance applied to the trigger to oppose the actuation force applied by the user's finger increases linearly until a designated posture 1402. Once the trigger reaches the designated posture 1402, the resistance increases to a resistance that prevents the user from easily pulling the trigger any further toward the fully-retracted posture. In other words, a hard stop is created at the designated posture 1402 that effectively shortens the pivot range of the trigger.

It will be appreciated that a hard stop may be created at any suitable posture within the pivot range of the trigger in order to create any desired trigger pull length. The shorter pivot range created by the resistance profile 1400 may be desirable to a user to make it easier to rapidly fire a virtual weapon in a video game.

FIG. 15 shows an example user-perceived resistance and assistance profile 1500 for a user-actuatable trigger. The resistance and assistance profile 1500 is plotted on a graph of trigger resistance/assistance versus time. During a first period 1502, the trigger resistance provided by the force-feedback motor linearly increases to oppose the actuation force applied to the trigger by the user's finger. During a second period 1504, the trigger resistance provided by the force-feedback motor is reduced from a peak resistance down to zero resistance. The first and second periods collectively form a profile similar to the resistance profile 1300 of FIG. 13. During a third period 1506, it is recognized that the user's finger has been lifted from the trigger, and the trigger is assisted with an assistance force provided by the force-feedback motor to pivot the trigger forward until it reaches the fully-extended posture.

It will be appreciated that the above described profiles are provided as examples and are meant to be non-limiting. Any suitable resistance and/or assistance may be provided to adjust a user-perceived state of a trigger.

Figure 16:
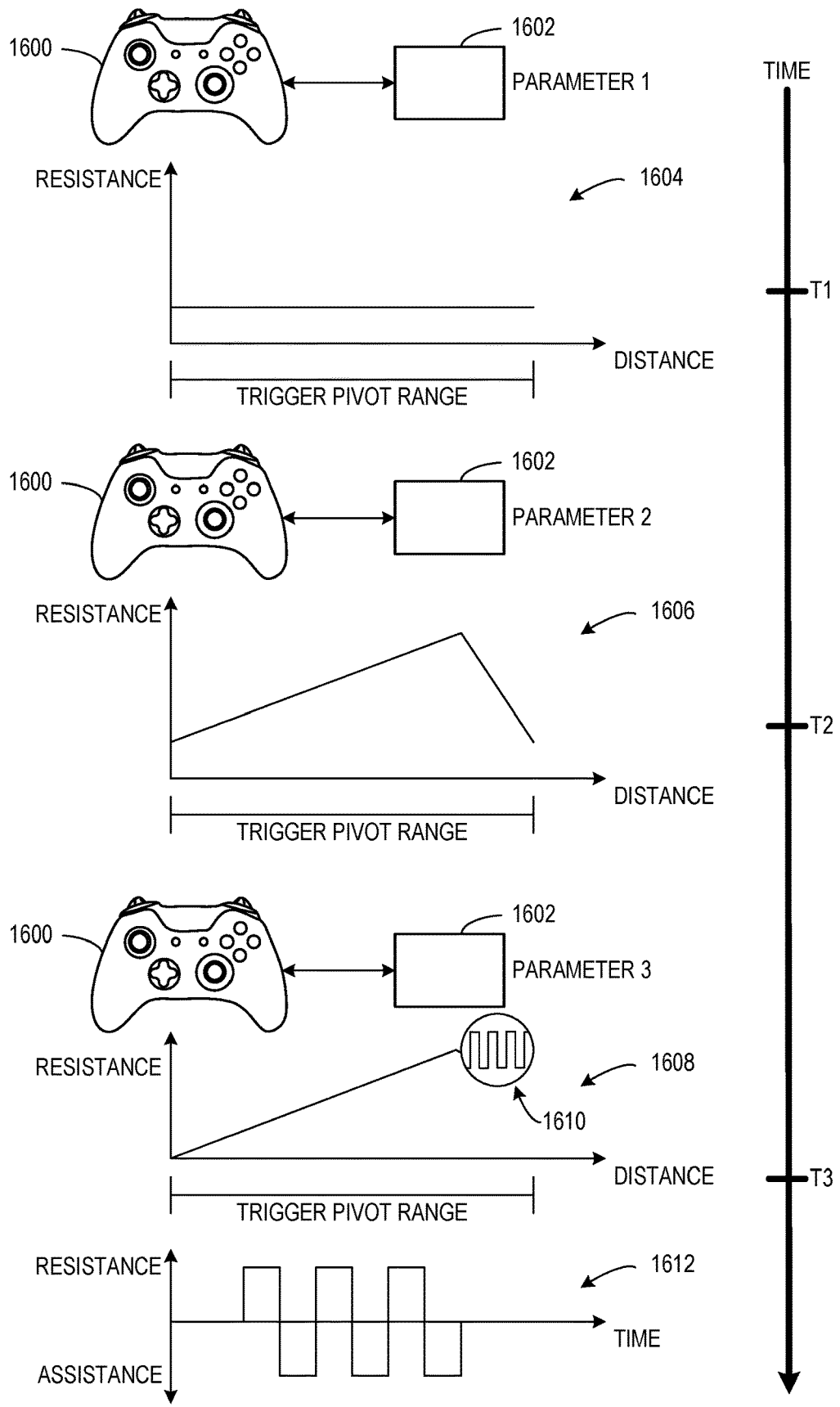
FIG. 16 shows an example scenario in which a user-perceived resistance of a user-actuatable trigger is dynamically changed based on a parameter of a computing device.
Figure 17:
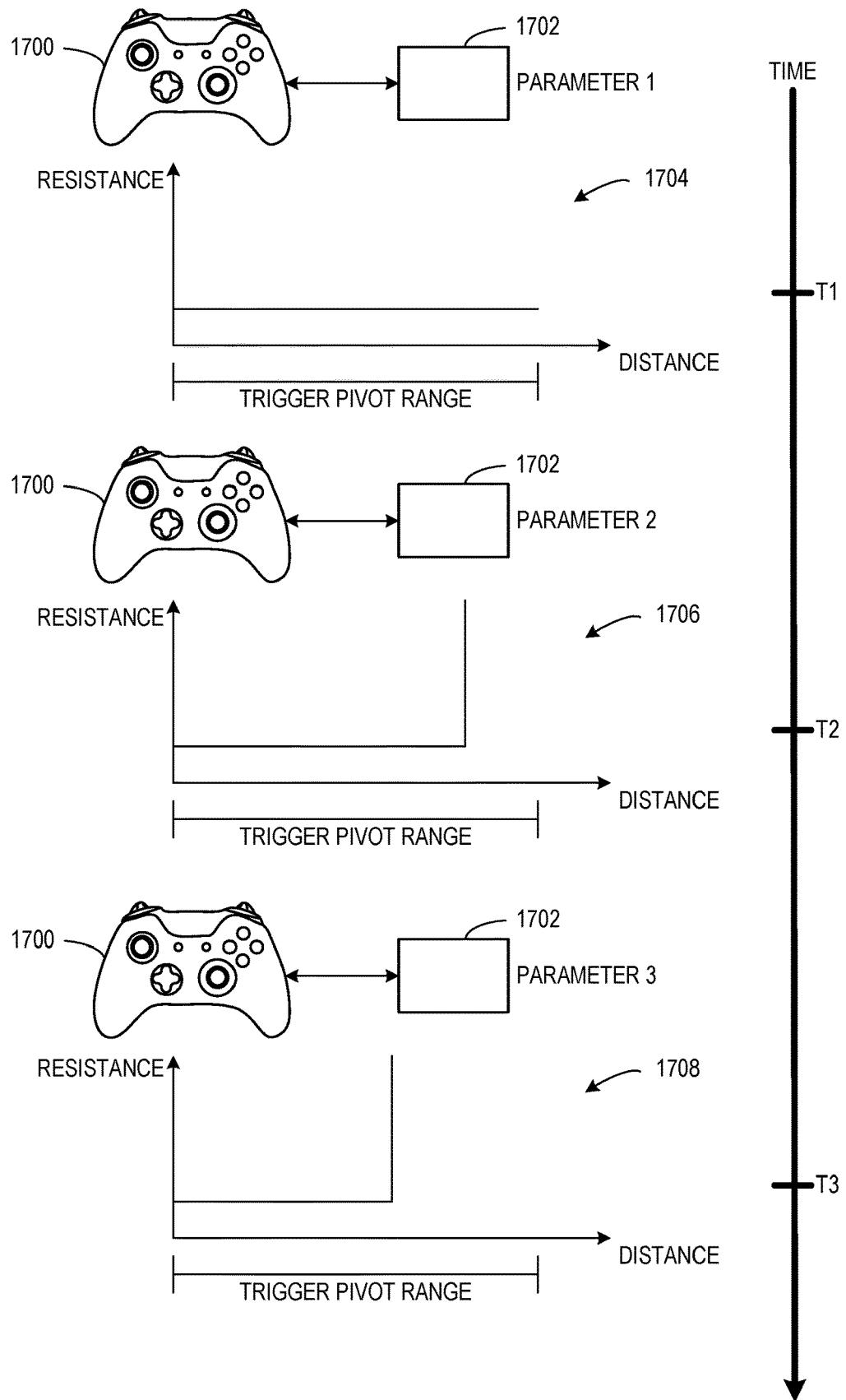
FIG. 17 shows an example scenario in which a hard stop of a user-actuatable trigger is dynamically changed based on a parameter of a computing device.
Figure 18:
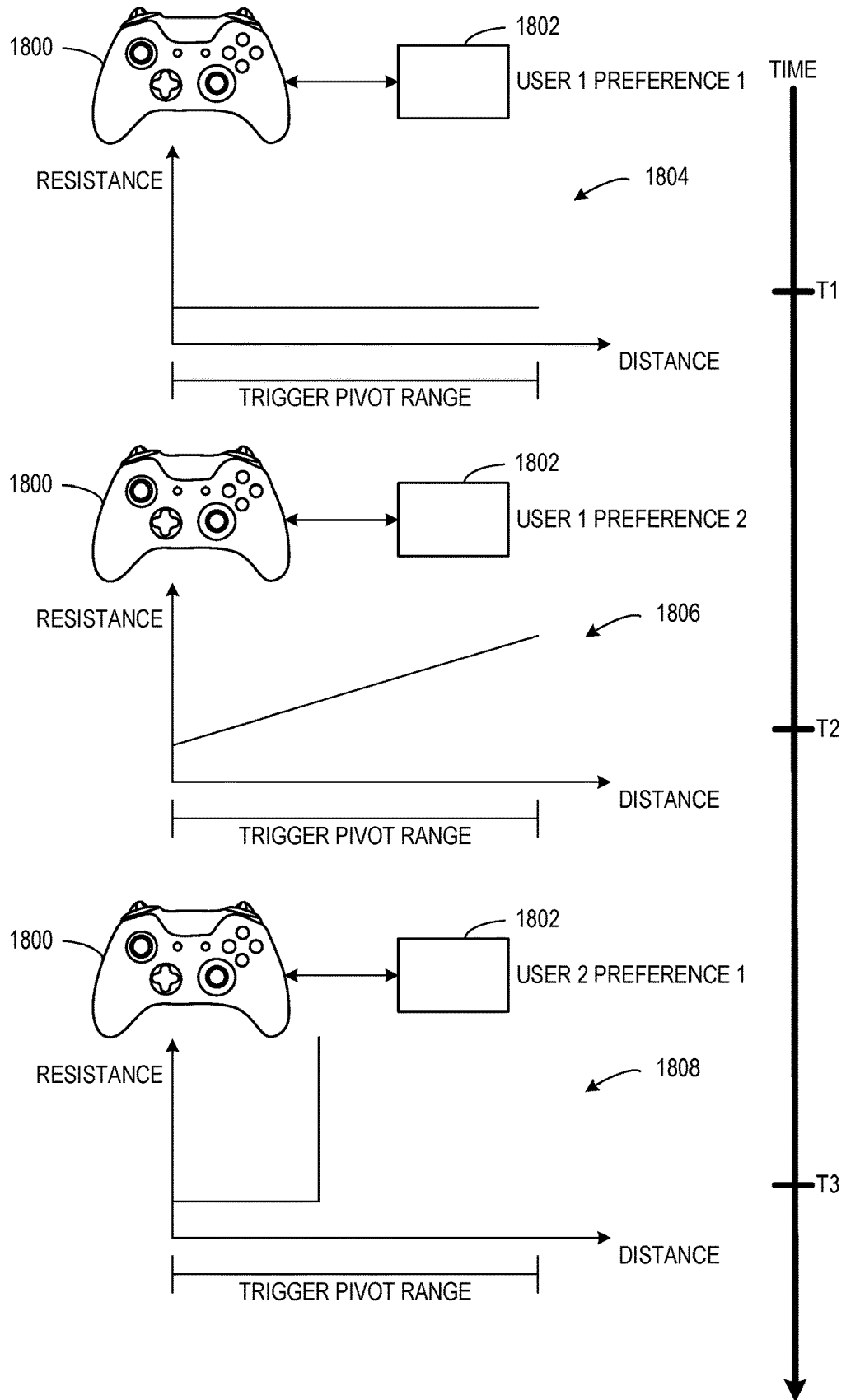
FIG. 18 shows an example scenario in which a user-perceived resistance of a user-actuatable trigger is dynamically changed based on a user preference.

The above described force-feedback trigger assemblies may enable a user-input device to dynamically change a user-perceived state of a trigger in any suitable manner under any suitable conditions. FIGS. 16-18 show different example scenarios in which a user-perceived resistance profile of a trigger is changed dynamically. FIG. 16 shows an example scenario in which a user-perceived resistance of a user-actuatable trigger is dynamically changed based on a parameter of a computing device. In this scenario, a user-input device 1600 is in communication with a computing device 1602. The user-input device 1600 sends trigger assembly state information to the computing device 1602, such as a trigger posture, an actuation force, and/or a detection of touch input to the trigger. The computing device 1602 sends force-feedback signals to the user-input device 1600. The force feedback signals are used to control the force-feedback motor to provide the appropriate resistance/assistance to the trigger.

At time T1, the computing device 1602 is operating in a first state, and the computing device 1602 sends force feedback signals to the user-input device 1600 to control the trigger according to a first resistance profile 1604. The first resistance profile 1604 may be selected based on a parameter of the computing device 1602 while operating in the first state. The first resistance profile 1604 specifies that a trigger resistance is constant across a pivot range of the trigger. For example, the first resistance profile 1604 may be a default profile, and the first state of the computing device 1602 may correspond to a state where a video game is not being executed, and the user is generically interacting with the computing device 1602 via the user-input device 1600. In this case, the parameter of the computing device 1602 specifies using the default profile.

At time T2, the computing device 1602 is operating in a second state, and the computing device 1602 sends force feedback signals to the user-input device 1600 to control the trigger according to a second resistance profile 1606. The second resistance profile 1606 may be selected based on a parameter of the computing device 1602 while operating in the second state. The second resistance profile 1606 specifies that a trigger resistance increases linearly over the course of the pivot range until a designated posture at which the resistance decreases for the remainder of the pivot range. For example, the second resistance profile 1606 may correspond to a trigger pull of a virtual semiautomatic weapon, and the second state of the computing device 1602 may correspond to a state where a video game is being executed. In particular, the video game may be a first-person-shooter (FPS) video game in which a virtual avatar that is controlled by the user is holding a virtual semi-automatic weapon where a single bullet is fired each time the trigger of the user-input device 1600 is pulled. In this case, the parameter of the computing device 1602 is a video game parameter that specifies using the profile associated with the virtual semi-automatic weapon.

At time T3, the computing device 1602 is operating in a third state, and the computing device 1602 sends force feedback signals to the user-input device 1600 to control the trigger according to a third resistance profile 1608. The third resistance profile 1608 may be selected based on a parameter of the computing device 1602 while operating in the third state. The third resistance profile 1608 specifies that the trigger vibrates or pulses while the trigger is in a designated region 1610 of the pivot range. The trigger resistance increases linearly from the fully extended posture to the boundary of the designated region 1610 at which point a stop is encountered. This simulates an initial "click" of the trigger. Further, while the trigger is in the designated region 1610, the trigger vibrates or pulses according to a vibration profile 1612. In particular, the force-feedback motor drives the trigger back and forth with alternating resistance and assistance forces based on the vibration profile 1612. For example, the third resistance profile 1608 and the vibration profile 1612 may correspond to a trigger pull of a virtual fully-automatic weapon. In this example, the trigger pulses or vibrates as long as the trigger remains in the designated region 1610 of the pivot range and the computing device 1602 specifies use of the vibration profile 1612. For example, the trigger may pulse until the user releases the trigger, the virtual fully-automatic weapon runs out of ammunition (or another parameter of the computing device changes). The third state of the computing device 1602 may correspond to a state where the FPS video game is being executed. In particular, the game state of the video game may change, because the virtual avatar that is controlled by the user is holding a different virtual weapon having different force-feedback characteristics. In this case, the parameter of the computing device 1602 is a video game parameter that specifies using the profile associated with the virtual fully-automatic weapon.

FIG. 17 shows an example scenario in which a hard stop of a user-actuatable trigger is dynamically changed based on a state of a computing device. In this scenario, a user-input device 1700 is in communication with a computing device 1702. At time T1, the computing device 1702 is operating in a first state, and the computing device 1702 sends force feedback signals to the user-input device 1700 to control the trigger according to a first resistance profile 1704. The first resistance profile 1704 may be selected based on a parameter of the computing device 1702 while operating in the first state. The first resistance profile 1704 specifies that a trigger resistance is constant across a pivot range of the trigger to allow the trigger to move through the entire pivot range. For example, the first resistance profile 1704 may be a default profile, and the first state of the computing device 1702 may correspond to a state where a video game is not being executed, and the user is generically interacting with the computing device 1702 via the user-input device 1700. In this case, the parameter of the computing device 1702 specifies using the default profile.

At time T2, the computing device 1702 is operating in a second state, and the computing device 1702 sends force feedback signals to the user-input device 1700 to control the trigger according to a second resistance profile 1706. The second resistance profile 1706 may be selected based on a parameter of the computing device 1702 while operating in the second state. The second resistance profile 1706 specifies that a trigger has a hard stop at a first designated posture of the pivot range. For example, the second state of the computing device 1702 may correspond to a state where the computing device 1702 is executing a FPS video game in which a virtual avatar that is controlled by the user is holding a first virtual weapon, and the second resistance profile 1706 corresponds to a trigger pull of the first virtual weapon. In this case, the parameter of the computing device 1702 is a video game parameter that specifies using the profile associated with the first virtual weapon.

At time T3, the computing device 1702 is operating in a third state, and the computing device 1702 sends force feedback signals to the user-input device 1700 to control the trigger according to a third resistance profile 1708. The third resistance profile 1708 may be selected based on a parameter of the computing device 1702 while operating in the third state. The third resistance profile 1708 specifies that a trigger has a hard stop at a different designated posture than the second resistance profile 1706. For example, the third state of the computing device 1602 may correspond to a state where the computing device 1702 is executing the FPS video game and the virtual avatar is holding a second virtual weapon that is different than the first virtual weapon, and the third resistance profile 1708 corresponds to a trigger pull of the second virtual weapon. In this case, the parameter of the computing device 1702 is a video game parameter that specifies using the profile associated with the second virtual weapon.

FIG. 18 shows an example scenario in which a user-perceived resistance of a user-actuatable trigger is dynamically changed based on a change in user preference. In this scenario, a user-input device 1800 is in communication with a computing device 1802. At time T1, the computing device 1802 sends force feedback signals to the user-input device 1800 to control the trigger according to a first resistance profile 1804 that is based on a first user preference of a first user. The first resistance profile 1804 specifies that a trigger resistance is constant across a pivot range of the trigger. The first resistance profile may be selected based on a user-preference parameter set by the first user.

At time T2, the computing device 1802 sends force feedback signals to the user-input device 1800 to control the trigger according to a second resistance profile 1806 that is based on a second user preference of the first user. The second resistance profile 1806 specifies that a resistance of the trigger increases linearly over the course of the pivot range of the trigger. The second resistance profile may be selected based on a user-preference parameter set by the first user.

The trigger resistance profile of the first user may automatically change based on the type of interaction the first user is having with the computing device 1802. For example, the first user may use the first resistance profile for a first video game, and the first user may user the second resistance profile for a second, different video game. In another example, the first user may use the first resistance profile for general computer interactions, such as navigating a website, and the first user may use the second resistance profile to play a video game.

At time T3, the computing device 1802 sends force feedback signals to the user-input device 1800 to control the trigger according to a third resistance profile 1808 that is based on a first user preference of a second user different than the first user. The third resistance profile may be selected based on a user-preference parameter set by the second user. The third resistance profile 1808 specifies that a trigger has a hard stop at a designated posture in the pivot range of the trigger. At time T3, the computing device 1802 recognizes that a different user is using the user-input device 1800 (e.g., the second user logs into the computing device), and automatically adjusts the resistance profile of the trigger based on the user preferences of the second, different user.

It will be appreciated that any suitable force-feedback characteristic of the trigger may be set and/or dynamically changed based on a user-preference parameter of a user. For example, a resistance, resistance profile, trigger tension, hard stop, and other force-feedback characteristics of a trigger may be set and/or dynamically changed based on user-preference parameters.

The above described scenarios are provided as examples and are meant to be non-limiting. A motor-driven, force-feedback trigger assembly may be controlled to dynamically adjust a user-perceived state of a trigger in any suitable manner based on any suitable conditions.

In an example, a user-input device comprises a user-actuatable trigger configured to pivot about a trigger axis, a rack gear, a return spring operatively intermediate the user-actuatable trigger and the rack gear, the return spring configured to forward bias the user-actuatable trigger toward an extended posture, a force-feedback motor configured to drive the rack gear based on a force-feedback signal and thereby adjust a spring force applied by the return spring to the user-actuatable trigger, and a posture sensor configured to determine a posture of the user-actuatable trigger about the trigger axis. In this example and/or other examples, the user-actuatable trigger may interface with the return spring via a guided connection that allows the user-actuatable trigger to move relative to the return spring. In this example and/or other examples, the user-actuatable trigger and the return spring collectively may include a pin-in-slot mechanism that forms the guided connection. In this example and/or other examples, the pin-in-slot mechanism may include a slot formed by the user-actuatable trigger and a pin coupled to the return spring and extending from the return spring into the slot. In this example and/or other examples, the slot may be positioned on a portion of the user-actuatable trigger that is spaced apart from the trigger axis. In this example and/or other examples, the force-feedback signal may be determined based at least on the posture of the user-actuatable trigger. In this example and/or other examples, the user-input device may further comprise a communication subsystem communicatively coupled to a computing device and configured to send the posture of the user-actuatable trigger to the computing device, and receive from the computing device the force-feedback signal. In this example and/or other examples, the force-feedback signal may be determined based at least on a parameter of the computing device. In this example and/or other examples, the parameter of the computing device may be user-adjustable. In this example and/or other examples, the parameter of the computing device may include a parameter of a video game executed by the computing device. In this example and/or other examples, the user-input device may further comprise one or more reduction gears operatively intermediate the rack gear and the force-feedback motor.

In an example, a user-input device comprises a user-actuatable trigger configured to pivot about a trigger axis, a rack gear, a return spring operatively intermediate the user-actuatable trigger and the rack gear, the return spring interfacing with the user-actuatable trigger via a guided connection that allows the user-actuatable trigger to move relative to the return spring, the return spring configured to forward bias the user-actuatable trigger toward an extended posture, a force-feedback motor configured to drive the rack gear based on a force-feedback signal and thereby adjust a spring force applied by the return spring to the user-actuatable trigger, and a posture sensor configured to determine a posture of the user-actuatable trigger about the trigger axis. In this example and/or other examples, the user-actuatable trigger and the return spring collectively may include a pin-in-slot mechanism that forms the guided connection. In this example and/or other examples, the pin-in-slot mechanism include a slot formed by the user-actuatable trigger and a pin coupled to the return spring and extending from the return spring into the slot. In this example and/or other examples, the slot may be positioned on a portion of the user-actuatable trigger that is spaced apart from the trigger axis. In this example and/or other examples, the user-input device may further comprise a communication subsystem communicatively coupled to a computing device and configured to send the posture of the user-actuatable trigger to the computing device, and receive from the computing device the force-feedback signal. In this example and/or other examples, the force-feedback signal may be determined based at least on a parameter of the computing device to provide a dynamic change in the spring force. In this example and/or other examples, the parameter of the computing device may be user-adjustable. In this example and/or other examples, the parameter of the computing device may include a parameter of a video game executed by the computing device.

In an example, a user-input device comprises a user-actuatable trigger configured to pivot about a trigger axis, a rack gear, a return spring operatively intermediate the user-actuatable trigger and the rack gear, the return spring configured to forward bias the user-actuatable trigger toward an extended posture, a force-feedback motor configured to drive the rack gear based on a force-feedback signal and thereby adjust a spring force applied by the return spring to the user-actuatable trigger, a posture sensor configured to determine a posture of the user-actuatable trigger about the trigger axis, and a communication subsystem communicatively coupled to a computing device and configured to send the posture of the user-actuatable trigger to the computing device, and receive from the computing device the force-feedback signal, wherein the force-feedback signal is determined based at least on a parameter of the computing device to provide a dynamic change in the spring force.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A user-input device comprising:
   a user-actuatable trigger configured to pivot about a trigger axis;
   a rack gear operatively interfacing with the user-actuatable trigger; and
   a force-feedback motor operatively interfacing with the rack gear and configured to drive the rack gear laterally to thereby adjust a user-perceived state of the user-actuatable trigger.

2. The user-input device of claim 1, wherein the force-feedback motor includes a drive gear including a plurality of gear teeth, wherein the rack gear includes a plurality of gear teeth meshing with gear teeth of the drive gear, and wherein force-feedback motor activation causes drive gear rotation that laterally translates the rack gear and thereby adjusts the user-perceived state of the trigger.

3. The user-input device of claim 1, wherein the user-actuatable trigger interfaces with the rack gear via a guided connection that allows the user-actuatable trigger to move relative to the rack gear.

4. The user-input device of claim 3, wherein the user-actuatable trigger and the rack gear collectively include a pin-in-slot mechanism that forms the guided connection.

5. The user-input device of claim 1, further comprising:
   a return spring operatively intermediate the user-actuatable trigger and the rack gear, the return spring configured to forward bias the user-actuatable trigger toward an extended posture.

6. The user-input device of claim 5, wherein the user-actuatable trigger interfaces with the return spring via a guided connection that allows the user-actuatable trigger to move relative to the return spring.

7. The user-input device of claim 6, wherein the user-actuatable trigger and the return spring collectively include a pin-in-slot mechanism that forms the guided connection.

8. The user-input device of claim 1, further comprising:
   a posture sensor configured to determine a posture of the user-actuatable trigger about the trigger axis, and wherein the force-feedback motor is configured to drive the rack gear based at least on the posture of the user-actuatable trigger determined by the posture sensor.

9. The user-input device of claim 1, further comprising:
   a force sensor configured to determine an actuation force applied to the user-actuatable trigger via finger manipulation, and wherein the force-feedback motor is configured to drive the rack gear based at least on the actuation force applied to the user-actuatable trigger determined by the force sensor.

10. The user-input device of claim 1, further comprising:
    a communication subsystem configured to receive a force-feedback signal from a computing device, the force-feedback signal determined based at least on a parameter of the computing device, and wherein the force-feedback motor is configured to drive the user-actuatable trigger via the rack gear based at least on the force-feedback signal.

11. A user-input device comprising:
    a user-actuatable trigger configured to pivot about a trigger axis;
    a posture sensor configured to determine a posture of the user-actuatable trigger about the trigger axis;
    a rack gear operatively interfacing with the user-actuatable trigger;
    a force-feedback motor operatively interfacing with the rack gear and configured to drive the rack gear to thereby adjust a user-perceived state of the user-actuatable trigger based at least on the posture of the user-actuatable trigger determined by the posture sensor.

12. The user-input device of claim 11, wherein the force-feedback motor includes a drive gear including a plurality of gear teeth, wherein the rack gear includes a plurality of gear teeth meshing with gear teeth of the drive gear, and wherein force-feedback motor activation causes drive gear rotation that laterally translates the rack gear and thereby adjusts the user-perceived state of the trigger.

13. The user-input device of claim 11, wherein the user-actuatable trigger interfaces with the rack gear via a guided connection that allows the user-actuatable trigger to move relative to the rack gear.

14. The user-input device of claim 13, wherein the user-actuatable trigger and the rack gear collectively include a pin-in-slot mechanism that forms the guided connection.

15. The user-input device of claim 11, further comprising:
    a return spring operatively intermediate the user-actuatable trigger and the rack gear, the return spring configured to forward bias the user-actuatable trigger toward an extended posture.

16. The user-input device of claim 11, further comprising:
    a force sensor configured to determine an actuation force applied to the user-actuatable trigger via finger manipulation, and wherein the force-feedback motor is configured to drive the rack gear based at least on the actuation force applied to the user-actuatable trigger determined by the force sensor.

17. A user-input device comprising:
    a user-actuatable trigger configured to pivot about a trigger axis;
    a rack gear;
    a return spring operatively intermediate the user-actuatable trigger and the rack gear, the return spring configured to forward bias the user-actuatable trigger toward an extended posture; and
    a force-feedback motor configured to drive the rack gear to thereby adjust a spring force applied by the return spring to the user-actuatable trigger.

18. The user-input device of claim 17, further comprising:
    a posture sensor configured to determine a posture of the user-actuatable trigger about the trigger axis, and wherein the force-feedback motor is configured to drive the rack gear based at least on the posture of the user-actuatable trigger determined by the posture sensor.

19. The user-input device of claim 17, further comprising:
    a force sensor configured to determine an actuation force applied to the user-actuatable trigger via finger manipulation, and wherein the force-feedback motor is configured to drive the rack gear based at least on the actuation force applied to the user-actuatable trigger determined by the force sensor.

20. The user-input device of claim 17, further comprising:
a communication subsystem configured to receive a force-feedback signal from a computing device, the force-feedback signal determined based at least on a parameter of the computing device, and wherein the force-feedback motor is configured to drive the user-actuatable trigger via the rack gear based at least on the force-feedback signal.

* * * * *